US009986586B2

United States Patent
Lee et al.

(10) Patent No.: US 9,986,586 B2
(45) Date of Patent: May 29, 2018

(54) RESERVATION OF UNLICENSED SPECTRUM IN A WIRELESS COMMUNICATIONS NETWORK

(71) Applicant: Intel IP Corporation, Santa Clara, CA (US)

(72) Inventors: Jeong Julie Lee, Portland, OR (US); Gang Xiong, Beaverton, OR (US); Hwan-Joon Kwon, Santa Clara, CA (US); Abhijeet Bhorkar, Fremont, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 293 days.

(21) Appl. No.: 14/750,849

(22) Filed: Jun. 25, 2015

(65) Prior Publication Data

US 2016/0227578 A1 Aug. 4, 2016

Related U.S. Application Data

(60) Provisional application No. 62/109,346, filed on Jan. 29, 2015.

(51) Int. Cl.
  *H04W 74/08* (2009.01)
  *H04W 74/00* (2009.01)
  (Continued)

(52) U.S. Cl.
  CPC ..... *H04W 74/0816* (2013.01); *H04W 74/004* (2013.01); *H04W 74/006* (2013.01); *H04W 16/14* (2013.01); *H04W 84/12* (2013.01)

(58) Field of Classification Search
  None
  See application file for complete search history.

(56) References Cited

U.S. PATENT DOCUMENTS 7,965,667 B2 6/2011 Tsai
2008/0107095 A1 5/2008 Black et al.
(Continued)

FOREIGN PATENT DOCUMENTS

WO 2015080796 A1 6/2015
WO WO 2015/167672 11/2015
(Continued)

OTHER PUBLICATIONS

International Search Report and Written Opinion for Patent Application No. PCT/US2015/019994 dated Jun. 18, 2015; 13 pages.
(Continued)

*Primary Examiner* — Anh Ngoc Nguyen
(74) *Attorney, Agent, or Firm* — Patent Capital Group

(57) ABSTRACT

Spectrum reservation circuitry for use in a source electronic device (e.g. eNB or UE) of a wireless communication system is provided. The availability of an unlicensed carrier for use is checked by control circuitry of the source device and a License Assisted Access (LAA) Request to Send signal is transmitted on an unlicensed carrier if it is determined to be available for use. Receive circuitry is configured to receive on an unlicensed carrier, from a destination electronic device an LAA Clear to Send signal in response, depending upon availability of the unlicensed channel at the destination. Corresponding spectrum reservation circuitry is provided for use in a destination device, comprising transmit circuitry to transmit the LAA Clear to Send signal. A corresponding computer program product is provided on a non-transitory medium.

21 Claims, 18 Drawing Sheets

(51) Int. Cl.
   *H04W 16/14*   (2009.01)
   *H04W 84/12*   (2009.01)

(56) References Cited

U.S. PATENT DOCUMENTS

| | | | |
|---|---|---|---|
| 2011/0096711 | A1 | 4/2011 | Liu et al. |
| 2012/0147804 | A1 | 6/2012 | Hedayat et al. |
| 2012/0307748 | A1 | 12/2012 | Cheng et al. |
| 2013/0188571 | A1 | 7/2013 | Cheong et al. |
| 2014/0029561 | A1 | 1/2014 | Kim et al. |
| 2014/0112289 | A1 | 4/2014 | Kim et al. |
| 2014/0341018 | A1 | 11/2014 | Bhushan et al. |
| 2014/0341135 | A1* | 11/2014 | Bhushan ........... H04W 28/0289 370/329 |
| 2015/0312793 | A1 | 10/2015 | Jeon et al. |
| 2016/0073344 | A1* | 3/2016 | Vutukuri ........... H04W 52/0216 370/252 |
| 2017/0006632 | A1 | 1/2017 | Elliott et al. |
| 2017/0013645 | A1* | 1/2017 | Choi ................. H04W 74/0816 |

FOREIGN PATENT DOCUMENTS

| | | |
|---|---|---|
| WO | WO 2016/122760 | 8/2016 |
| WO | WO 2016/122786 | 8/2016 |

OTHER PUBLICATIONS

International Search Report and Written Opinion for International Application No. PCT/US2015/062174 dated Mar. 7, 2016; 13 pages.
Alcatel-Lucent Shanghai Bell, Alcatel-Lucent; "LBT Enhancements for Licensed-Assisted Access"; Agenda Item 6.3.2.2; 3GPP TSG RAN WG1 Meeting #79, R1-144701; San Francisco USA, Nov. 17-21, 2014; 5 pages.
Alcatel-Lucent Shanghai Bell, Alcatel-Lucent; "Hidden node problem and potential solutions for LAA"; Agenda Item 6.3.2.2; 3GPP TSG RAN WG1 Meeting #79, R1-144703; San Francisco USA, Nov. 17-21, 2014; 4 pages.
Ericsson, Qualcomm, Huawei; "Study on Licensed-Assisted Access using LTE"; 3GPP TSG RAN Meeting #64, RP-140770; Agenda Item 14.1.1; Sophia Antipolis, France, Jun. 10-13, 2014; 7 pages.
International Search Report and Written Opinion for International Application No. PCT/US2015/065230 dated Mar. 7, 2016; 14 pages.
Kyocera; "Further considerations on the essential functionalities for LAA"; 3GPP TSG RAN WG1 Meeting #79, R1-144955; Agenda Item: 6.3.2.2; San Francisco, USA, Nov. 17-21, 2014; 10 pages.
Broadcom Corporation, Cablelabs; "Robust Coexistence LAA-LTE"; 3GPP TSG RAN WG1 Meeting #79, R1-145167; Agenda Item: 6.3.2.2; San Francisco, USA, Nov. 17-21, 2014; 9 pages.
3rd Generation Partnership Project; 3GPP TS 36.213, "LTE; Evolved Universal Terrestrial Radio Access (E-UTRA); Physical Layer Procedures"; Version 12.3.0.; Release 12; Oct. 2014; 214 pages.
3rd Generation Partnership Project; 3GPP TS 36.212, "LTE; Evolved Universal Terrestrial Radio Access (E-UTRA); Multiplexing and Channel Coding"; Version 12.2.0; Release 12; Oct. 2014; 91 pages.
International Preliminary Report on Patentability in PCT International Application Serial No. PCT/US2015/062174 dated Aug. 1, 2017 (7 pages).
International Preliminary Report on Patentability in PCT International Application Serial No. PCT/US2015/065230 dated Aug. 1, 2017 (7 pages).
International Preliminary Report on Patentability in PCT International Application Serial No. PCT/US2015/019994 dated Nov. 1, 2016 (9 pages).

* cited by examiner

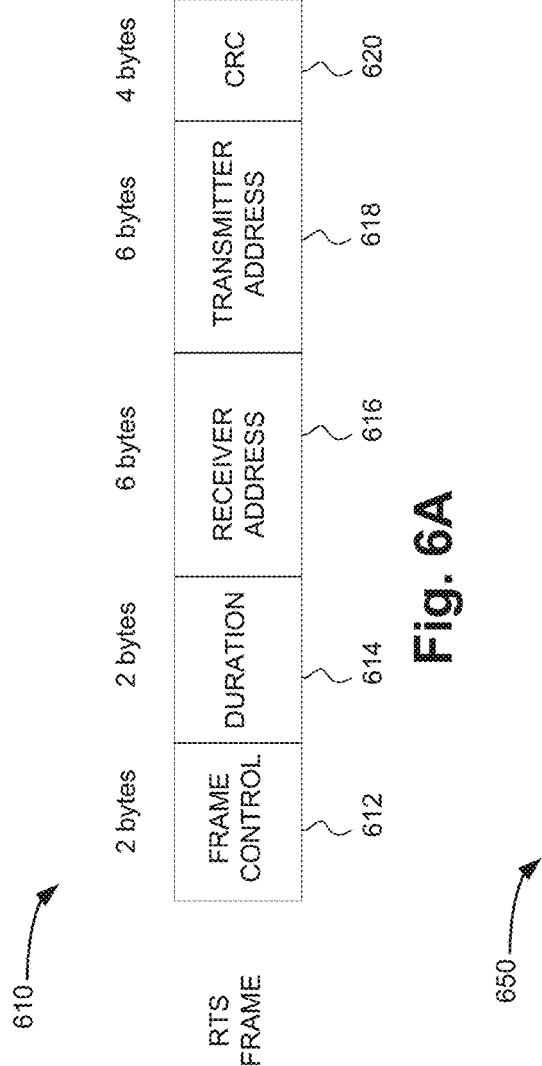
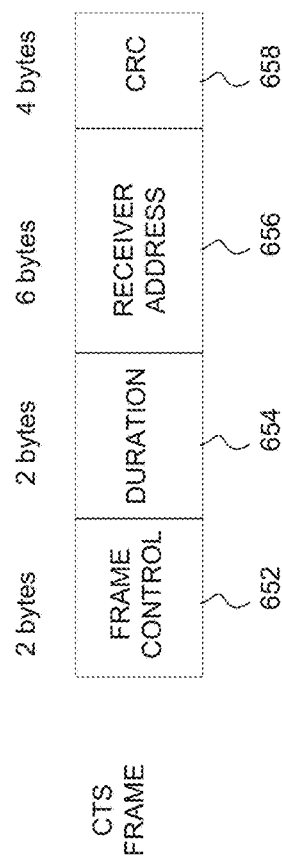

RESERVATION OF UNLICENSED SPECTRUM IN A WIRELESS COMMUNICATIONS NETWORK

CROSS REFERENCE TO RELATED APPLICATIONS

The present application claims priority to U.S. Provisional Patent Application No. 62/109,346 filed 29 Jan. 2015, entitled "Enhanced RTS/CTS for LTE Licensed Assisted Access (LAA) Operation in the Unlicensed Spectrum", the entire disclosure of which is hereby incorporated by reference.

TECHNICAL FIELD

Embodiments relate to the field of wireless communications and the reservation of unlicensed (or contentiously-accessed) spectrum by devices in a wireless communication network.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) and LTE-Advanced (LTE-A).

In 3GPP radio access network (RAN) LTE and LTE-A systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNodeB) to the wireless device (or UE), and the uplink (UL) transmission can be a communication from the wireless device to the node. Instead of communication via eNodeBs, communication between wireless equipment can be performed using peer-to-peer or device-to-device communication.

As mobile technology advances, there is a requirement to provide accommodate progressively increasing demands for use of the wireless spectrum due to increasing user numbers and individual user demand for increased data throughput.

Carrier aggregation allows a single wireless connection to use multiple radio frequency (RF) carriers, known as Component Carriers (CCs) and increases channel bandwidth so that peak and average throughput can be increased. LTE Release 10 version defines signaling to support up to five component carriers to give a maximum combined channel bandwidth of up to 100 MHz. Component carriers can be intra-band contiguous, intra-band non-contiguous or even located in different bands (inter-band non-contiguous). Carrier aggregation is applicable to both uplink and downlink directions and to both Frequency Division Duplex (FDD) and Time Division Duplex (TDD).

Carrier aggregation is considered as one of the main approaches to increase data rate performance of LTE-A systems and beyond. There are a large number of Release-10 UEs already available on the market that support aggregation of two carriers. It is expected that demands of carrier aggregation (CA) capable UEs with aggregation of multiple carriers in the future will become even higher. For example, LTE with Licensed-Assisted Access (LAA), which is also known as LTE for unlicensed spectrum or "LTE LAA", may operate a with large number component carriers that may be aggregated at the UE to increase the peak data rate. Examples of unlicensed frequencies that could be utilized for carrier aggregation are 5 GHz, 2.4 GHz and 5150-5350 MHz. Unlicensed spectrum may include any RF spectrum that is contentiously accessed by electronic devices of the wireless communication network. By way of contrast, licensed spectrum (carriers) are non-contentiously accessed.

Conventionally, the LTE/LTE-A system utilizes licensed spectrum to operate. However, due to the increased user data rate demand over wireless and the explosive mobile traffic growth, industry is converging fast to utilize unlicensed spectrum for supplemental downlink and uplink capacity of an LTE system. To that end, a new study item, "Study on Licensed Assisted Access (LAA) using LTE", has been approved by the 3rd Generation Partnership Project (3GPP) in RAN #65 meeting. LAA will feature Carrier Aggregation (CA) mechanism to aggregate a primary cell (PCell) or primary carrier, using licensed spectrum, to transmit critical information that requires quality of service and to control handover between cells, and a secondary cell (SCell) or secondary carrier, using unlicensed spectrum, for best effort data. LAA also studies the coexistence with other wireless technologies and the conformance to the regulatory requirements in unlicensed spectrum. The primary carrier and secondary carrier(s) may be denoted component carriers, as is conventional in carrier aggregation.

There is a requirement to provide a channel reservation mechanism in LTE LAA that takes account of the coexistence between different operators and different wireless technologies such as WiFi, all potentially competing for contentious access to the unlicensed spectrum. It is known to apply "listen-before-talk" criteria, which relies upon establishing carrier availability by instantaneous sensing of the RF medium, to mediate access to unlicensed carriers in LTE LAA. It is known in WiFi to employ CSMA/CA for contentious access to the medium and to use an RTS/CTS handshaking procedure to reduce the impact of hidden nodes when a point-to-point WiFi connection is established. In previously proposed LTE LAA systems, there is a preference that wireless connection establishment on LTE LAA should be implemented on the primary carrier (licensed spectrum) to ensure robustness. However, this can result in latency due to predetermined timing constraints imposed in LTE between, for example, an eNB scheduling request being sent and a response being received from the UE. Thus there is a perceived need for a lower latency mechanism for establishing an unlicensed spectrum connection and to make more efficient use of unlicensed spectrum in LTE LAA.

BRIEF DESCRIPTION OF THE DRAWINGS

Embodiments described herein are illustrated, without limitation, by way of example, in the accompanying drawings:

FIG. 6A schematically illustrates an IEEE 802.11 RTS Frame;

FIG. 6B schematically illustrates an IEEE 802.11 CTS Frame;

DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Figure 1:
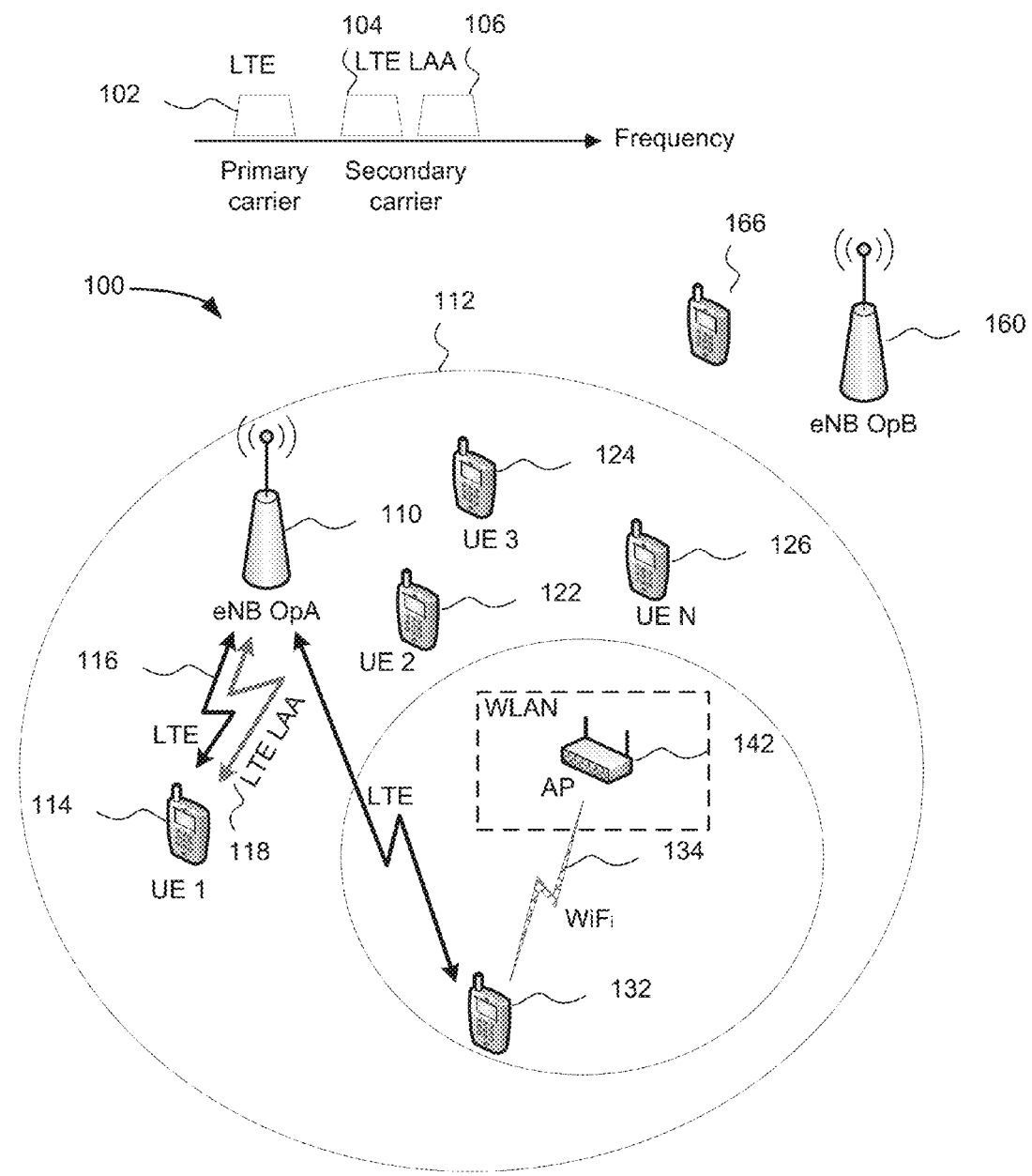
FIG. 1 schematically illustrates a wireless communication system implementing LTE LAA.

FIG. 1 schematically illustrates a wireless communication system implementing LTE LAA by integrating it into an LTE licensed network. Although many operators have deployed WiFi Access Points (AP) to offload some cellular traffic to unlicensed spectrum, the lack of good coordination between the WiFi system and the LTE system can lead to inefficient use of the RF spectrum. To improve efficiency, in LTE LAA, unlicensed carriers are integrated into the LTE system deployed in licensed carriers, with few changes to the LTE air-interface. LTE LAA systems may include, for example, co-located unlicensed and licensed carriers with a macro eNodeB cell encompassing the smaller cells associated with one or more operator-deployed Micro/Pico Remote Radio Heads (RRH). An optical fiber can be used to link the Macro eNB and a Micro/Pico RRH, providing a high speed backhaul link. Integration between licensed and unlicensed carriers when both operating LTE is achieved using carrier aggregation mechanisms as defined in Release 10 and Release 12 of LTE.

The licensed carriers serve as primary carriers and unlicensed spectrum is utilized by secondary carriers associated with and controlled by the primary carriers. FIG. 1 shows a frequency bandwidth 102 in licensed spectrum corresponding to a primary carrier and two distinct frequency bandwidths 104, 106 corresponding to unlicensed secondary carriers. Carrier aggregation is explained in more detail below with reference to FIG. 2. The primary carrier/secondary carrier relationship allows for reuse of basic LTE physical layer design for data transport on the unlicensed carriers. UE mobility (handover between cells) is under control of the licensed network and the LTE and LTE LAA carriers are jointly scheduled. This arrangement allows LTE LAA to exploit the security, quality of service and interference mitigation schemes of the LTE licensed network. The secondary cells can be activated and deactivated to enable opportunistic use of unlicensed spectrum. In LTE-A, the unlicensed spectrum can be operated as a TDD carrier on both UL and DL or as a DL only carrier. FDD is not used because it requires pairs of frequencies for UL/DL and availability of the matching pair cannot be guaranteed due to the contentious nature of the medium access in unlicensed spectrum.

The wireless communication system of FIG. 1 includes a macro-eNB 110 and an associated coverage cell 112. The macro-eNB 112 is shown to have an active connection with a first UE 114 within the cell 112 and the connection comprises both an LTE link (carrier) 116 and an LTE LAA link (carrier) 118. A second UE 122, a third UE 124 and a fourth UE 126 are also within range of the eNB 110 and able to establish radio connections on UL and DL. However, not all UEs will be LAA capable (i.e. able to establish a LTE LAA connection such as 118), some UEs will be merely WiFi capable; this depends on the type of modem in the UE. A WiFi capable UE 132 is shown in FIG. 1, which has a WiFi connection 134 with a WLAN access point 142. The WiFi capable UE 132 also has an LTE connection 152 with the eNB 110.

However, the unlicensed spectrum usage by the WiFi capable UE 132 is non-transparent and the unlicensed carriers have to be manually configured. By way of contrast, according to LTE LAA, the unlicensed carriers can be automatically configured by the Radio Resource Control protocol layer of LTE, which performs addition, removal and reconfiguration of secondary component carriers once the original connection with the licensed primary component carrier has already been established. The Media Access Control (MAC) layer at the transmitting side is responsible for distributing data across the configured set of component carriers according to wireless resources allocated by an LTE scheduler.

FIG. 1 shows a second macro-eNB 160 corresponding to a different operator from the first eNB 110. The coverage cell (not shown) of the second macro-eNB 160 partially overlaps the cell 112 and the two different operators could both deploy LTE LAAeNBs using the same unlicensed band. This co-existence issue in the non-exclusive use of unlicensed spectrum requires careful management. This disclosure is in line with the previous solutions aiming at better coexistence with existing WLAN systems and multiple LTE operators. To facilitate opportunistic use of unlicensed channels, it is important to have in place an efficient mechanism for instantaneous channel sensing to establish if an unlicensed carrier is busy or idle and also an effective mechanism for unlicensed spectrum/channel reservation. The present technique provides such a mechanism. In this specification, the term eNB can include a Home eNB and is not limited to a macro-eNB.

Given the opportunistic nature of operation in unlicensed spectrum, LAA operation in LTE LAA should consider coexistence between multiple LTE operators as well as between LTE and other technologies such as 802.11 WLAN (Wireless Local Area Network)/WiFi. In distributed coordination function (DCF) WLAN systems based on the Carrier Sense Multiple Access with Collision Avoidance (CSMA/CA), a node continues to perform a Clear Channel Assessment (CCA), by sensing the "medium" (Radio Frequency, RF, spectrum) to check whether the channel is busy or idle. If the medium (e.g. a particular bandwidth or frequency range) is idle for more than a certain duration of time, then the node assumes that it may take ownership of the medium and may transmit data. Before data transmission, an optional Request to Send/Clear to Send (RTS/CTS) exchange mechanism may be used to further minimize the effect of collision due to hidden nodes. It is required by the IEEE (Institute of Electrical and Electronics Engineers) 802.11 specification, which is also referred to as "WiFi", that the WLAN nodes, including the access point (AP), should honor the received RTS/CTS messages and should not access the medium for the specified duration of time.

CSMA/CA works on the principles of: (i) listen before talk; and (ii) contention. "Listen before talk" is an ETSI (European telecommunications Standards institute) requirement. It is an asynchronous data communication system providing a best effort service but no bandwidth and/or latency guarantee and in this sense it is fundamentally different from the channel access mechanism used by LTE, which allows control of latency and quality of service. CSMA/CA starts by listening on a radio channel (carrier sense) and if the channel is idle a first packet is sent in a transmit queue. However, if the channel is sensed to be busy/occupied (due to either transmission by another network device or as a result of interference), the network node waits until the end of the current transmission and then starts "contention", which involves waiting a random duration of time before transmitting a packet, provided that the channel is still idle. The contention is a random number generated for every packet and the node having the shortest contention delay wins.

Collisions cannot be detected on radio waves (unlike the case for e.g. Ethernet) because of the requirement to switch between transmit and receive. A problem with "hidden nodes" arises in the transmission of radio waves because the attenuation of radio waves can mean that one node may not hear another resulting in substantially simultaneous transmissions. These transmissions can collide in the receiver of a network node located between these two transmitting nodes.

RTS/CTS as implemented in WLAN/WiFi represents a solution to the WiFi hidden node problem by requiring handshaking between a source and a destination node: before sending a packet, a source node sends an RTS and awaits a CTS from the destination node, indicating that the channel is clear in the area of the destination node. Every node within range of the CTS can reliably receive the CTS, even if they cannot hear the RTS due to radio wave attenuation. The WiFi RTS and CTS signals include information on the size of the message being transmitted so that other nodes know how long the transmission is likely to last. Thus all nodes avoid accessing the channel after hearing the CTS even if the carrier sense at the node indicates that the medium is free. This collision avoidance mechanism of RTS/CTS is sometimes referred to as "virtual carrier sense".

Figure 2:
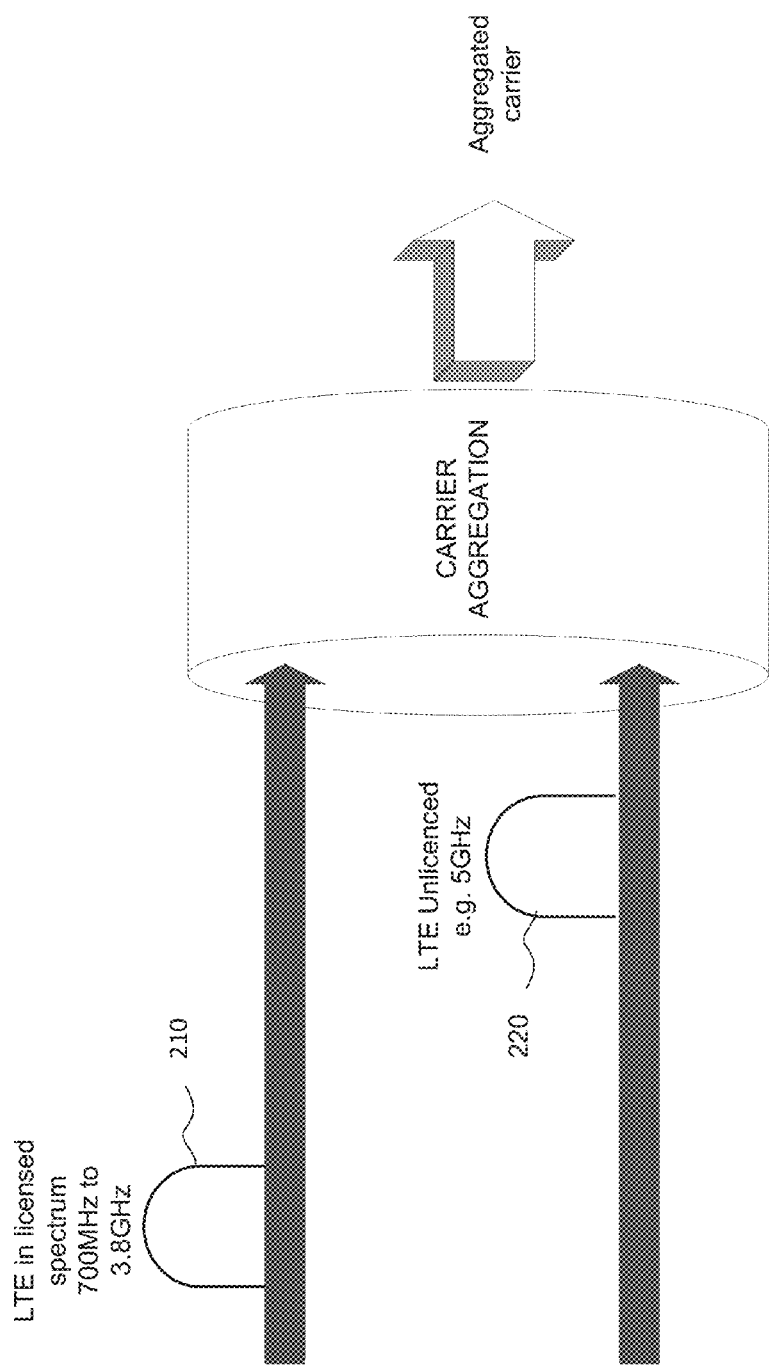
FIG. 2 schematically illustrates how an aggregated carrier applicable to LTE LAA is composed.

FIG. 2 schematically illustrates how an aggregated carrier is composed. A first component carrier 210 is a component carrier in the licensed spectrum, for example, within the range 700 MHz to 3 GHz. A second component carrier 220 uses LTE communication protocols on an unlicensed carrier frequency of 5 GHz. Wi-Fi uses a completely different communication protocol from LTE on the same 5 GHz carrier frequency. The constituent component carriers may be mediated by either the same or different wireless access points such as two different eNodeBs, but the UE 114 should be within range of these different access points. The different component carriers are likely to have different Quality of Service constraints, different channel conditions and other differing characteristic properties. Accordingly, the rate of errors detected by the UE 114 upon reception of data may vary considerably for different component carriers. Furthermore, an acceptable tolerance-level of transmission errors may differ between component carriers depending upon the type of data being carried and the service being provided. The secondary carriers are not restricted to being unlicensed carriers, but may also include licensed carriers.

Figure 3:
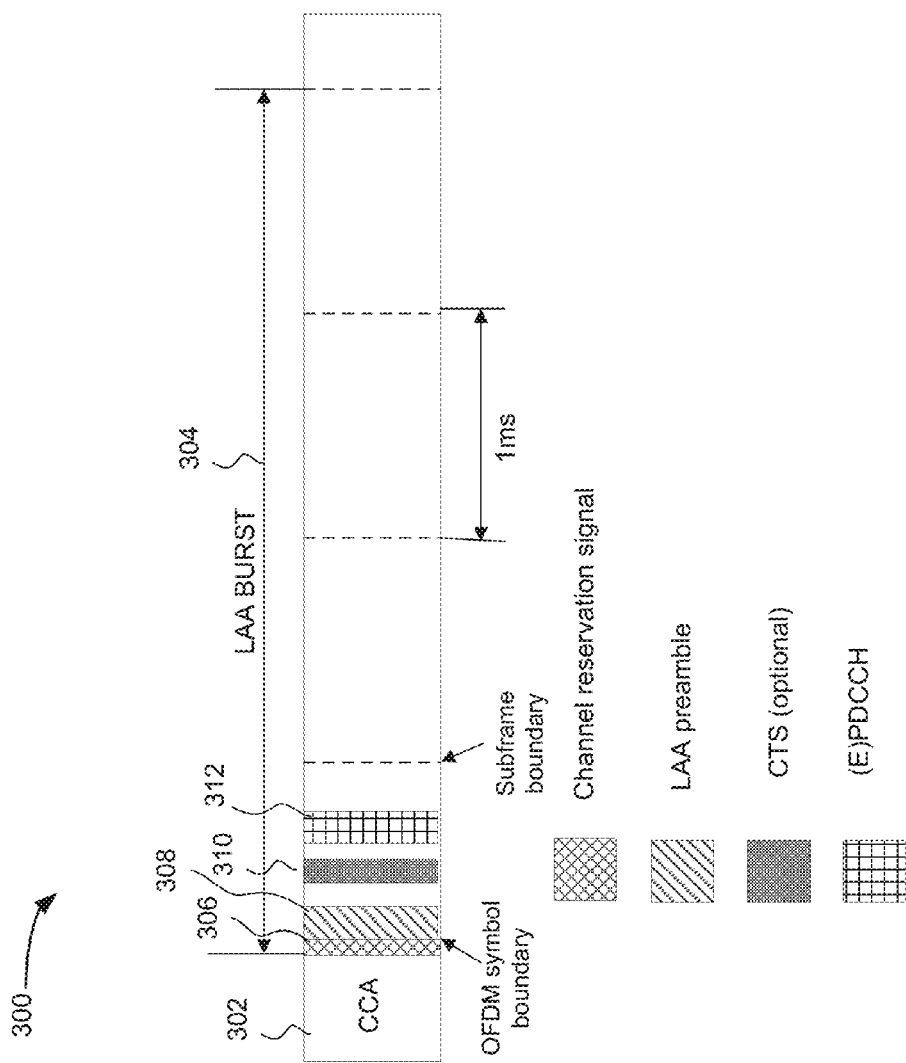
FIG. 3 schematically illustrate an LAA burst frame structure which may provide functionality for RTS/CTS.

FIG. 3 shows an LAA burst frame structure which may provide functionality for RTS/CTS. Frame bursting is a technique supported by WiFi/WLAN to provide some control over quality of service and it can be used to increase the throughput of a point-to-point (or point to multi-point) link. In a normal (non-burst) mode only one source can transmit data at a time and each network node contends for airtime during a DIFS (Distributed lnterframe Space). If the medium is free then one frame can be transmitted and the destination must send an ACK within a short period of time, known as the SIFS (Short Interframe Space), immediately afterwards. If the source does not receive the ACK within the SIFS then it should be resent. However, after receiving an ACK, the source must wait for a longer time, the DIFS, and only then (if the medium is idle), can the source begin transmission of a subsequent frame. In burst frame mode, after a first frame is transmitted and an ACK received, the source does not need to wait for the DIFS, but instead waits only for the SIFS before transmitting a subsequent frame. The total transmission time in burst frame mode is limited to avoid completely blocking out other sources from the contentious-access medium. However, temporarily suspending the DIFS requirement between frames during the burst frame period has the benefit of increasing data throughput during the burst frame period.

The burst frame 300 of FIG. 3 comprises a Clear Channel Assessment (CCA) field prior to an LAA burst duration 304 that comprises four contiguous one millisecond subframes. The LAA burst comprises; a channel reservation signal 306; an LAA preamble; an optional CTS 312; and downlink control data on an LTE (enhanced) Physical Downlink Control Channel, (E)PDCCH, 312. All four of these fields 306, 308, 310 and 312 are contained within a single one millisecond subframe and the beginning of the LAA preamble coincides with the OFDM symbol boundary of the LTE downlink frame.

This disclosure elaborates the adoption and enhancement of RTS/CTS protocol in LTE LAA system with the goal of minimizing, or at least reducing, the involved inefficiency and improving the latency involved in channel reservation.

According to the present technique, an RTS/CTS protocol specially adapted for LTE LAA operation is provided. Features contributing to improved efficiency and reduced latency according to embodiments include:

An LAA RTS/CTS procedure over the unlicensed bands (as opposed to licensed bands) in the radio spectrum;

An LAA CTS design that allows multiplexing of the physical resources for multiple UEs including a modulation scheme (unlike RTS/CTS in WiFi, which operates only on point-to-point connections).

In terms of RTS/CTS procedure for LTE LAA operation, the following are potential limitations and drawbacks of alternative solutions, which embodiments may ameliorate.

The adoption of the RTS/CTS exchange as in the WLAN system between LTE eNB and UE is limited to establishing a point-to-point link and does not provide for a one-to-many point link as between a plurality of UEs and a given eNB. Thus previously known systems do not allow a multiplexing of the physical resources for multiple UEs in the LTE system either when reserving spectrum and/or when communicating data on an unlicensed carrier.

Figure 4:
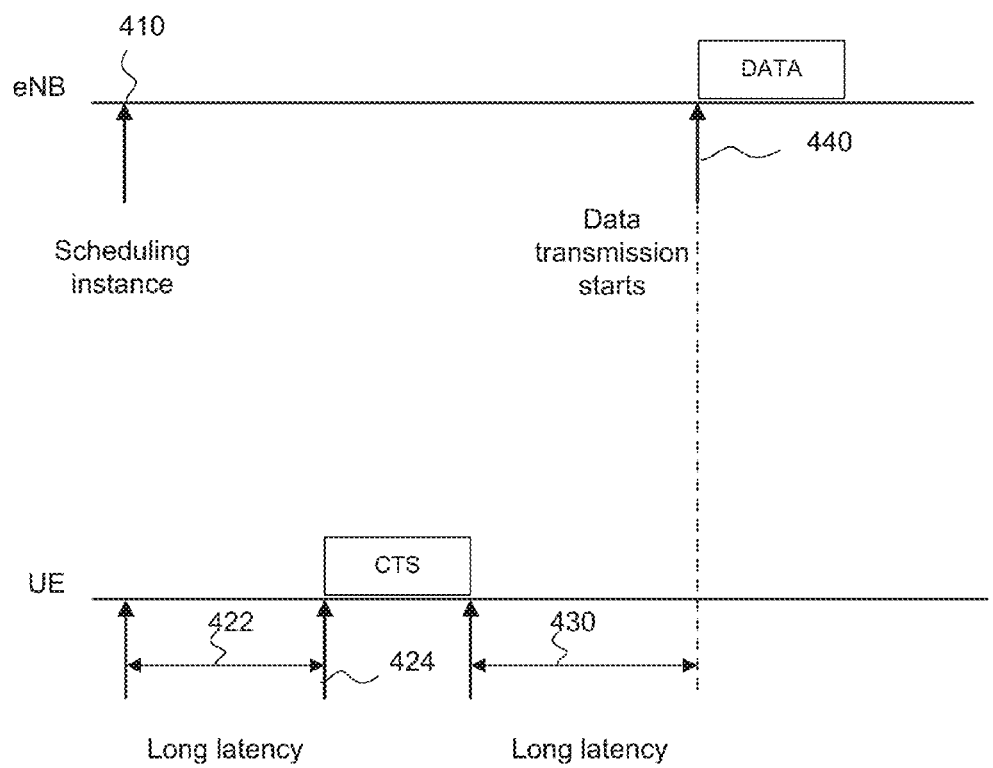
FIG. 4 schematically illustrates long latency in a previously known channel reservation procedure.

In the licensed frequency band, the existing LTE design has imposed some timing constraints between the eNB scheduling and the actual UL transmission from the UE (e.g. 4 ms). One potential drawback of a policy that transmits CTS Tx (transmit) Command and CTS feedback on the licensed band is mainly on the delay incurred between the time when the CTS Tx Command is sent (i.e., eNB scheduling an UL transmission for CTS feedback message) and the time when the actual data transmission of CTS feedback is sent by the UE. The total latency at the eNB is due to an LTE timing requirement of four subframes as specified in the 3GPP/LTE specification 3GPP TS 36.213. As shown in FIG. 4, due to the long latency involved in the scheme, it reserves a channel for an unnecessarily long period of time, preventing other nodes from transmitting.

In particular, FIG. 4 shows a scheduling instance 410 in an eNB, which will be followed by an eNB CCA and RTS transmission (not shown). There is a first long latency 422 between the scheduling instance 410 and the beginning of CTS transmission by the UE (destination device) at point 424. There is a second long latency period 430 between completion of the CTS transmission by the UE and the commencement 440 of data transmission by the eNB, following successful receipt of the CTS sent by the UE. This RTS/CTS procedure on the licensed carrier it is prone to lose ownership of the channel to other WLAN nodes that might wake up during the long latency intervals 422, 430 and occupy (take control of) the channel without knowing of the prior RTS transmission.

The above mentioned drawbacks of the previous solutions can be eliminated, or at least reduced, by the present technique which provides an LAA RTS/CTS procedure in which multiple UEs can be multiplexed, providing a one-to-many point connection and reducing RTS/CTS exchange latency. In this disclosure, RTS and CTS are exchanged in unlicensed spectrum that does not mandate the same licensed band LTE timing requirement, so the time interval (latency) between when an RTS signal is transmitted and when data transmission associated with the original request starts can be reduced to less than one LTE subframe (i.e. less than 1 ms). The latency can be further reduced with a new CTS signal type that can span only one or a fractional (i.e. a portion of one) OFDM symbol on the downlink, or an equivalent one or fractional symbol on the SC FDMA uplink (for LTE radio frame structure and symbols within a timeslot see FIG. 10 as described below).

LAA RTS/CTS Procedure According to Embodiments

Figure 5:
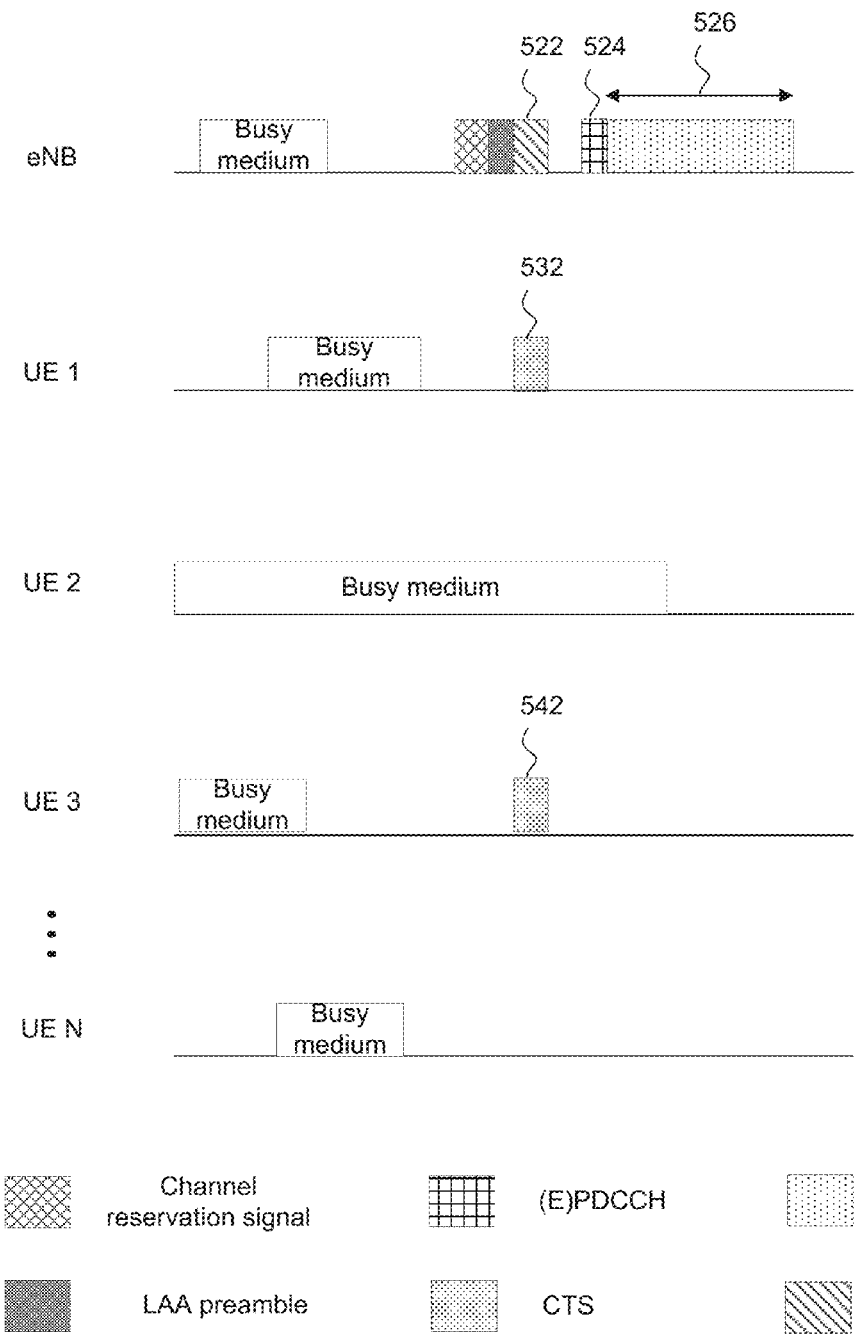
FIG. 5 schematically illustrates an LAA RTS/CTS procedure providing multiplexed CTS according to an embodiment.

LAA RTS and CTS frame structure can be the same as the ones in WiFi (IEEE 802.11) with some modifications to the existing fields in order to enable both WiFi capable UEs and LAA capable UEs to decode the messages contained within the frames. Alternatively, the new frame structure may comprise new RTS and CTS messages specially designed for LAA operation, especially which allows multiplexing of CTSs from multiple UEs for reduced RTS/CTS exchange latency. The LAA RTS/CTS procedure with a new multiplexed CTS is illustrated in FIG. 5. The below procedure is described as downlink operation, but the same or similar principles should be applied in uplink channel reservation operation as well. For example, in the case of uplink channel reservation, multiplexed RTS signals from a plurality of UEs are sent to the eNB, such that the eNB receives a multiplexed RTS signal. It will be appreciated that in any wireless connection there will be a source device and a destination device. For an uplink connection, the UE will be the source device and the eNB will be the destination device. For a downlink connection the eNB will be the source device whereas the UE will be the destination device.

The LAA RTS/CTS procedure, as illustrated for the downlink example by FIG. 5, consists of the following elements:

Element 1: The eNB (data source) checks if the unlicensed spectrum is idle or an energy level present over the unlicensed spectrum is below a threshold by using CCA and/or extended CCA (ECCA) mechanism.

Element 2: When the unlicensed spectrum is idle or an energy level present over the unlicensed spectrum is below a threshold, the eNB transmits an LAA RTS signal 522. Prior to transmission of the RTS 522, a channel reservation signal and an LAA preamble are transmitted by the eNB. In this FIG. 5 example embodiment, the RTS 522 includes identifiers for UE1, UE2 and UEN, (but not UE2) via unlicensed spectrum to the UEs to which it has data to send. The RTS can be sent by unicast (serially where more than one UE is identified), by multicast or by broadcast. The LAA RTS frame structure can be either the same as the one in WiFi with modifications to the existing non-critical fields or a new RTS designed for LAA operation.

Element 3: Upon successful reception of LAA RTS, the UE (data destination) transmits LAA CTS to the eNB via unlicensed spectrum, but only if the unlicensed spectrum is idle and UE identifier or UE index is included in LAA RTS. In the Example of FIG. 5, upon receipt of a broadcast RTS signal 522, UE1, UE3 and UEN all have an available "medium" (an unlicensed component carrier). However, UE3 was not specifically identified in the RTS so does not respond with a CTS despite the carrier being idle at the location of UE3. UE1 sends a CTS signal 532 and UE3 sends a CTS signal 542 substantially simultaneously, in response to receipt of the RTS 522. Similarly to the RTS frame structure, the LAA CTS frame structure can be the same as the one in WiFi or a new multiplexed CTS designed for LAA operation. The RTS and CTS frame structures need not match so that. For example, a modified WiFi RTS structure could be implemented together with a new multiplexed CTS frame structure.

Element 4: The eNB transmits downlink scheduling and control information on a (E)PDCCH connection 524 and data via a PDSCH 526, all via unlicensed spectrum to the UEs (i.e. UE1 and UEN in this example) who sent CTS. If cross-carrier scheduling is used, then eNB transmits downlink scheduling and control information via licensed spectrum instead of unlicensed spectrum.

Embodiment of Element 1: eNB Channel Sensing

The eNB can perform CCA and/or ECCA to check the medium status.

The minimum duration to perform CCA can be configured to follow the "Listen Before Talk" requirement if applicable, e.g. 20 microseconds. Listen Before Talk is one way of dealing with co-existence when implementing LTE-U.

Embodiment of Element 2: eNB LAA RTS Transmission

LAA RTS can be transmitted as a stand-alone message irrespective of LAA burst frame (i.e. without using the LAA burst frame) or, alternatively, as part of the LAA burst frame of FIG. 3.

Where the LAA RTS is included in the LAA burst frame, it can be either stand-alone or part of LAA control message, e.g. the LAA preamble 308. The stand-alone LAA RTS within the LAA burst frame 300 can be transmitted before or after the channel reservation message 306 and/or LAA control messages, e.g. LAA preamble 306 or (E)PDCCH 312 containing downlink scheduling and control information of the scheduled UE(s) whose CTS is successfully received, but before data transmission.

The LAA RTS can include parameters such as UE identifiers, channel reservation duration, the interval time required between RTS and CTS and/or CTS and (E)PDCCH/Data, and transmit power and/or modulation for CTS. At least one of these parameters may be included, jointly, severally or in combination.

If an LAA control message such as the LAA preamble 308 is adopted, some or all of the RTS parameters can be transmitted in the LAA control message.

UE identifiers can be specified in the form of unicast, multicast or broadcast.

UE identifiers can be multiplexed in a form of C-RNTI (Cell Radio Network Temporary Identifier) or bitmap. The C-RNTI is a UE identifier that is unique within a given cell. The bitmap information can be specified in RRC signaling.

An interval time required for appropriate message spacing, e.g. between RTS and CTS and/or CTS and (E)PDCCH/Data, can be predefined in the specification or alternatively can be carried in LAA RTS, LAA preamble or RRC signaling.

The interval time can be matched to Short Inter-Frame Spacing (SIFS) or can be set to a value less than Distributed Coordination Function (DCF) Inter-Frame Spacing (DIFS) defined in a WLAN system in order to continuously gain the medium. Then, other WLAN stations should detect a busy medium through CCA carrier sense and should not attempt to transmit at the same time. The CCA at the UE need not be the same as the one eNB is using. The radio conditions at the source device and the destination device may differ considerably in terms of interference conditions and unlicensed spectrum occupation (busy/idle).

The interval time can be specified such that LAA CTS transmission 310 does not need to be aligned to LTE subframe boundary.

If LAA RTS follows the WiFi RTS frame structure in order to enable both WiFi capable UEs and LAA capable UEs to decode the message, it can leave critical RTS fields that WiFi-capable UEs need to decode in order for them to set Network Allocation Vector (NAV) but can alter non-critical fields to suit LAA operation. The NAV is a CSMA/CA parameter corresponding to a counter maintained each electronic device to represent the amount of time that is to elapse before the medium becomes free again, when it is currently occupied by a device that has reserved unlicensed spectrum. The Duration field of the RTS is typically used by other devices to set their NAVs.

For example, WiFi frame RTS fields for Frame Control, Duration and FCS can be retained without modification, but the Receiver address and Transmitter address fields are modified/adapted relative to the WiFi implementation to make them more suitable for use in LTE LAA.

FIG. 6A schematically illustrates an IEEE 802.11 RTS Frame 610 comprising: a 2 byte frame control field 612; a 2 bytes duration field 614; a 6 byte receiver (destination) address field 616; a 6 byte transmitter (destination) address field 618; and a 4 byte Cyclic Redundancy Check field 620. The receiver address 616 gives the recipient of the next frame and the transmitter address 618 gives the source of the RTS frame. The duration filed 614 contains a value corresponding to a time in microseconds given by a total of the transmission duration of the next frame plus time for a CTS frame, an ACK frame and three SIFS (one each for: (i) RTS frame; (ii) CTS frame; and; final ACK)

FIG. 6B schematically illustrates an IEEE 802.11 CTS Frame 650 comprising: a 2 byte frame control field 652; a 2 byte duration field 654; a 6 byte receiver (destination) address field 656; and a 4 byte Cyclic Redundancy Check field 658. The CTS Frame 650 differs from the RTS frame 610 in that it has no transmitter address field. The duration is reduced relative to the RTS frame duration by a CTS time and the associated SIFS time. The CTS receiver address 656 is simply copied from the transmitter address 618 in the preceding RTS frame.

The 6 bytes of Receiver address 616 of the IEEE 802.11 RTS frame is redefined to address a LAA UE or a set of UEs according to the modified WiFi RTS frame structure of the present technique. Upon reception of the LAA RTS, WiFi UEs will notice that the reception address is not intended for themselves and honor the RTS for the set duration. On the other hand, LAA capable UE(s) addressed in LAA RTS will proceed to CTS transmission.

The new address scheme should be designed such that it does not collide with the WiFi address range.

If it indicates a set of UEs, multicast or broadcast LAA UE address scheme can be used.

The 6 bytes used for Transmitter Address 618 in WiFi RTS can be redefined solely for LAA operation because WiFi UEs do not need to understand this field. For example, it can include parameters such as a total number of RTSs, whether this RTS is the final RTS in this message or if instead the next RTS is coming, LAA transmitter address or identifier, and/or CTS start time.

The LAA RTS that follows WiFi RTS frame structure can be used with LAA CTS that follows either the WiFi CTS frame structure or a new multiplexed CTS. Also, an LAA RTS that has a new frame structure can be used with either (i) LAA CTS that follows the WiFi CTS frame structure or (ii) a new multiplexed CTS.

If LAA RTS/CTS follows the WiFi frame structure of FIGS. 6A&B, for single UE scheduling, a pair of RTS and CTS is exchanged. For multiple UE scheduling, robust RTS/CTS exchange the following options are implemented: (1) one or more RTSs are transmitted in a sequence before either multiplexed or sequential CTS transmissions start from the destination UEs or (2) the next RTS/CTS round starts after the previous RTS/CTS round is over.

Embodiment of Element 3: UE LAA CTS Transmission

Upon successful reception of LAA RTS addressed to it, the UE(s) whose CCA and/or ECCA is true (unlicensed carrier available) transmits an LAA CTS to the eNB. The CCA duration that the UEs should perform before LAA CTS transmission can start before or after LAA RTS reception.

The UE(s) whose CCA and/or ECCA is false (medium busy) does not transmit LAA CTS even if LAA RTS indicates that it needs to transmit an LAA CTS.

LAA CTSs from multiple UEs are multiplexed in fractional or one or multiple OFDM symbols by various multiplexing schemes, e.g. CDMA-based or interleaved FDMA (IFDMA).

LAA CTS from each UE may include only one bit of value that may correspond to ACK or the duration of channel reservation or LAA burst. In addition, when UE detects the unlicensed carrier is busy, it does not transmit in the CTS.

If one bit carries duration information, the duration range that corresponds to value 0 and 1 each can be predefined in the specification or carried in LAA RTS, LAA preamble or RRC signaling.

Whether the one bit information corresponds to ACK or duration can be carried in LAA RTS, LAA preamble or RRC signaling.

LAA CTS may carry more than one bit information that corresponds to the duration of the LAA burst or the reservation, e.g. the time between when the CTS transmission ends and when the data transmission ends.

LAA capable nodes such as LAA UEs or other LAA eNBs, which do not send CTS but overhear LAA CTS from other UEs, should honor the LAA CTS and should not attempt to transmit for the duration of channel reservation if duration is specified in LAA CTS.

If LAA CTS follows WiFi CTS frame structure in order to enable both WiFi capable UEs and LAA capable UEs to decode the message, it can leave critical CTS fields that WiFi capable UEs need to decode in order to set Network Allocation Vector (NAV) but alter non-critical fields to suit LAA operation.

For example, it can leave Frame Control, Duration and FCS but change Receiver address structure.

The 6 bytes of Receiver address can be redefined to address a LAA UE or a set of UEs and other information for LAA operation such as ACK. Upon reception of the LAA CTS, WiFi UEs will notice that it is CTS from other node and honor the CTS for the set duration. On the other hand, LAA capable UE(s) have two behaviors. LAA UEs not addressed in LAA RTS will honor the LAA CTS, but LAA UEs addressed in LAA RTS as multicast or broadcast will not honor the CTS and proceed to CTS transmission.

Embodiment of Element 4: Scheduling and Data Transmission by eNB

The eNB sends the (E)PDCCH(s), via unlicensed band (or licensed band if cross carrier scheduling is used), containing downlink scheduling and control information of the UEs which send LAA CTS in response to LAA RTS. The scheduling and control information can include identifiers of the scheduled UEs, modulation and coding schemes (MCS), resource allocation (e.g., PRB assignment), etc.

The eNB sends the data as scheduled by (E)PDCCH(s).

Figure 7:
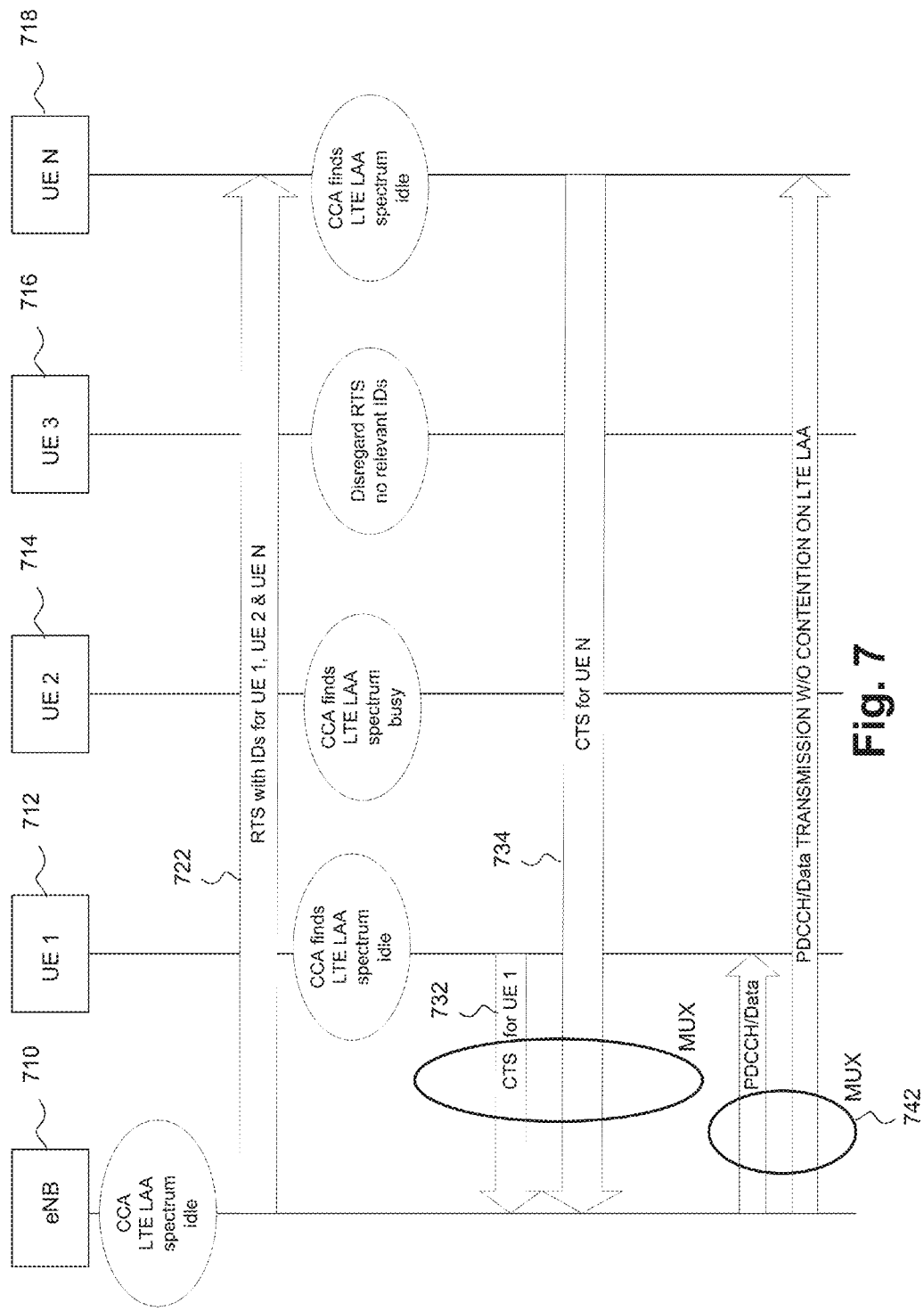
FIG. 7 schematically illustrates a signal flow for the downlink CTS/RTS spectrum reservation communication of FIG. 5.

FIG. 7 schematically illustrates a signal flow for the downlink CTS/RTS spectrum reservation communication of FIG. 5. Vertical timelines are how for each of an eNB 710, a UE #1 712; a UE #2 714; an UE #3 716 and a UE #N 718. An RTS signal 722 is transmitted by the eNB to all four UEs 712, 714, 716, 718. Upon receipt to the RTS signal 722, UE #1, UE #2 and UE #N, for which the RTS signal 722 includes identifiers, each perform CCA. The UE #3 716 does not perform CCA because the RTS signal 722 is not addressed to it. UE #2 714 finds the medium busy in its vicinity, so does not respond to the RTS signal 722. However, both UE #1 712 and UE #N 718 establish locally that the relevant unlicensed spectrum is clear and they each return a respective CTS 732, 734. Although the two CTS signals 732, 734 are transmitted from different UEs, the LAA control signaling provides that they are mapped onto the physical layer such that they are multiplexed 736 in the frequency and/or time domain using at least one of FDM, TDM and CDM. Finally PDCCH (control parameters) and data are transmitted 742 on the unlicensed carrier, destined for UE #2 and UE #N and having access for a limited duration, to the unlicensed carrier without contention.

Figure 8:
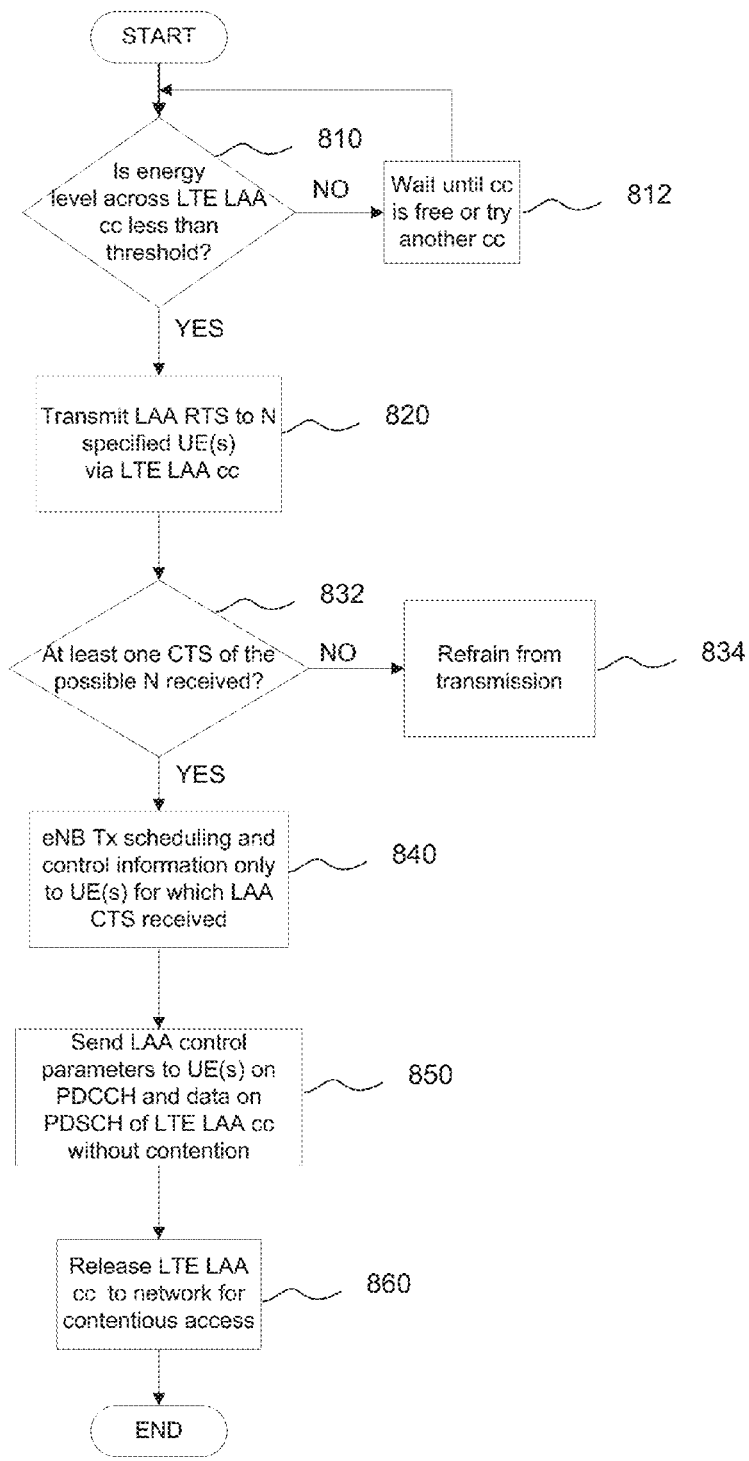
FIG. 8 is a flow chart schematically illustrating a spectrum reservation process from the perspective of the connection initiator (data source)

FIG. 8 is a flow chart schematically illustrating a spectrum reservation process from the perspective of the connection initiator (data source). In this example, the eNB is the source device setting up a downlink connection on LTE LAA. At process element 810 the eNB performs CCA to check if the energy level across the unlicensed component carrier is sufficiently low to indicate that the channel is available. If the unlicensed component carrier is busy then the process element 812 where it waits until the medium becomes available or tries another component carrier.

However, if the LTE LAA carrier is found to be free at process element 810, then at process element 820, the eNB proceeds to transmit an RTS signal to one or more target (destination) UEs (in this case to 1 to N UEs where N is an integer of 1 or more) via unlicensed spectrum of the carrier that it determined to be free. Thereafter, at process element 832, the eNB awaits receipt of a CTS signal in response to the RTS signal. If more than one target UE out of the N addressed by the RTS signal responds to say that the unlicensed carrier is available in its locality then the received CTS signal will be a multiplexed signal upon receipt by the eNB (data source). In this case the received CTS signal will be demultiplexed to determine which UEs have responded positively to the RTS signal. If no CTS signal is received then the eNB will refrain from transmitting scheduling information to the UE(s) at process element 834 but may try to gain access to the unlicensed carrier at a later time.

Upon successful receipt of a CTS signal, at process element 840, the eNB transmits scheduling and control information to establish the LTE LAA downlink connection with the particular UEs that responded to the RTS signal. The LAA control parameters are sent on the PDCCH and the message data is sent on the PDSCH without contention.

Once the downlink communication has finished, at process element 860, the unlicensed carrier is released to the network and is available for contentious access. The process then ends.

Figure 9:
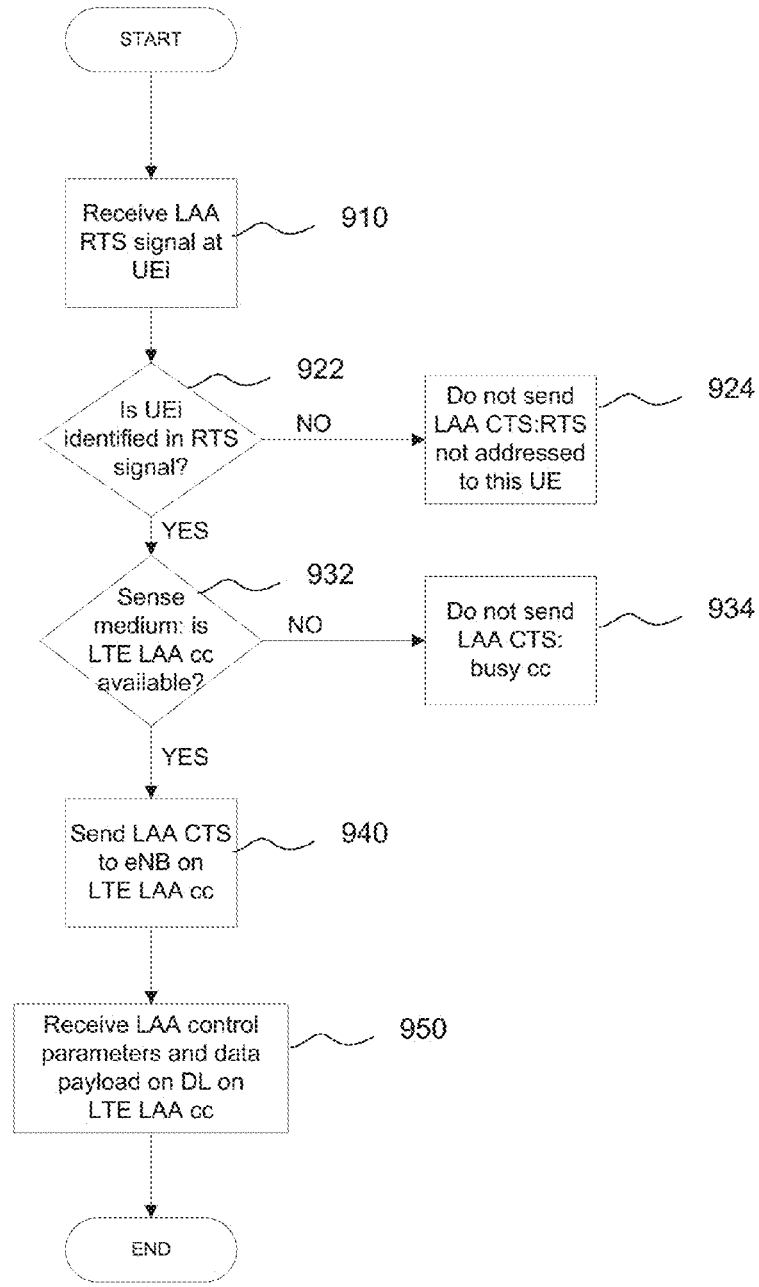
FIG. 9 is a flow chart that schematically illustrates a spectrum reservation process from the perspective of a destination device.

FIG. 9 is a flow chart that schematically illustrates a spectrum reservation process from the perspective of the connection target (intended destination for data). In this particular example, the destination is a UE and the connection is a downlink connection. At process element 910, the UE receives an RTS signal and at process element 922 it is determined by the UE whether or not it is identified (addressed) in the RTS signal. If it is not identified then the RTS signal is disregarded at process element 924 and no CCA check is performed. However, if the UE is specifically identified then at process element 932 the RF spectrum is sensed locally to determine whether or not the LTE LAA component carrier is available. Due to attenuation of RF waves, contention from nearby network devices and interference, even if the LTE LAA component carrier is available at the eNB, it may be currently unavailable at the target UE. If the UE senses that the carrier is busy locally then no CTS is sent. However, if the carrier is idle or has energy levels below a threshold then it sends a CTS signal to the eNB in response at process element 940. The CTS signal is sent on unlicensed spectrum and may be mapped onto physical resources such that it is multiplexed with a CTS from a different target UE. At process element 950 the UE receives LAA control parameters together with the data payload on RF spectrum corresponding to the unlicensed component carrier.

Figure 10:
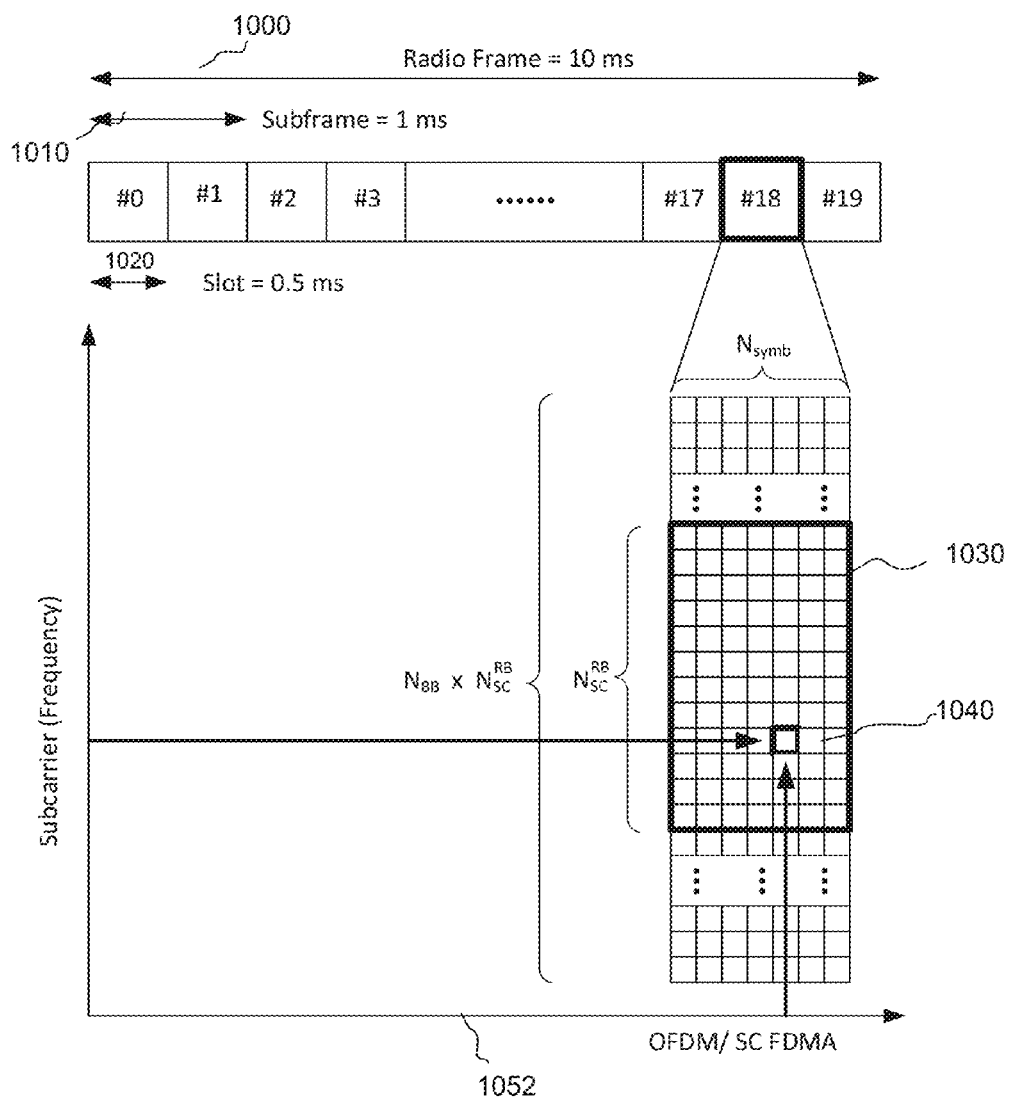
FIG. 10 schematically illustrates the structure of an LTE downlink/uplink radio frame.

FIG. 10 schematically illustrates radio frame resources corresponding to an LTE radio frame structure according to some embodiments. The LTE radio frame 1000 has a total duration of 10 milliseconds and is composed of twenty contiguous 0.5 millisecond slots. A subframe 1010 is formed from two adjacent slots and thus has a one millisecond duration. FIG. 10 shows slot #18, which is the penultimate slot of the frame, in more detail. A single resource block 1030 can be seen to comprise a number of symbols $N_{symb}=7$ on a time axis 1052 and a plurality of subcarriers $N_{SC}^{RB}=12$ on a frequency axis 1054. On the downlink these are OFDM symbols, but on the uplink SC FDMA is used instead of OFDM. Each symbol occupies a ½ fraction of the 0.5 ms slot 1020. The resource block 1030 comprises a total of $N_{symb} \times N_{SC}^{RB}$ constituent resource elements.

A single resource element 1040 is characterized by a single subcarrier frequency and a single symbol. In FIG. 2, although only one complete resource block 230 is shown, a plurality of resource blocks NBB are associated with each of the twenty slots of the radio frame 200. The resource block 1030 in the FIG. 10 is mapped to eighty-four (12 subcarriers times seven symbols) resource elements 1040 using normal cyclic prefixing. In one alternative arrangement (not shown) the resource block is mapped to seventy-two resource elements using extended cyclic prefixing.

Each resource element 1040 can transmit a number of bits depending upon the particular type of modulation scheme employed for the channel with which the resource element is associated. For example, where the modulation scheme is quadrature phase-shift keying (QPSK), each resource element 240 can transmit two bits. The resource block 1030 can be configured either for downlink or uplink transmission.

Note that as mentioned above, multiplexed LAA CTS may carry one bit or more than one bit information. The detailed designs for these two schemes are described as follows:

Multiplexed LAA CTS Design when 1-Bit Information is Carried

LAA CTS from the multiple UEs specified in the LAA RTS are multiplexed in the frequency and/or time domain, e.g. FDM, TDM, CDM or combination of these schemes.

Note that when UE detects the medium is busy, it will not transmit the CTS on the unlicensed carrier. Further, as only 1 bit information is carried in the CTS for each UE, a BPSK (Binary Phase Shift Key) modulation scheme can be adopted to ensure robust CTS detection at eNB's receiver.

In one embodiment, IFDMA can be adopted to generate the multiplexed CTS from the multiple UEs by allocating each UE to a different set of SubCarrier Groups (SCGs) in the frequency domain. In particular, K subcarriers can be grouped to form a SubCarrier Group (SCG). Then, the total number of SCGs is $$N_{SCG} = \lceil N_{SC}/K \rceil \text{ or } N_{SCG} = \lfloor N_{SC}/K \rfloor,$$

where the square brackets with only lower bars represent a floor function (rounding down to the nearest integer), $N_{SC}$ is the total number of subcarriers in the frequency band. And, the maximum number of SCGs per UE is $$N_{SCG}^{UE} = \lceil N_{SCG}/L \rceil \text{ or } N_{SCG}^{UE} = \lfloor N_{SCG}/L \rfloor,$$

where L is the total number of UEs designated in LAA RTS to send LAA CTS.

The ith UE, i=0, 1, 2, . . . , L−1 is assigned to a set of SCGs that starts from ith SCG, $SCG_i$, and spans to every Lth SCG up to $N_{SCG}$−1th SCG:

$$S_{SCG}^{UE_i} = i + n \cdot L,$$

where $S_{SCG}^{UE_i}$ is a set of SCGs assigned to $UE_i$, and n=0, 1, 2, . . . , $N_{SCG}^{UE}$−1. In addition to this equally distributed SCGs, different partition among the SCGs and UEs can be used.

If an UE does not transmit LAA CTS, the SCGs allocated to the UE does not carry any information.

Figure 11:
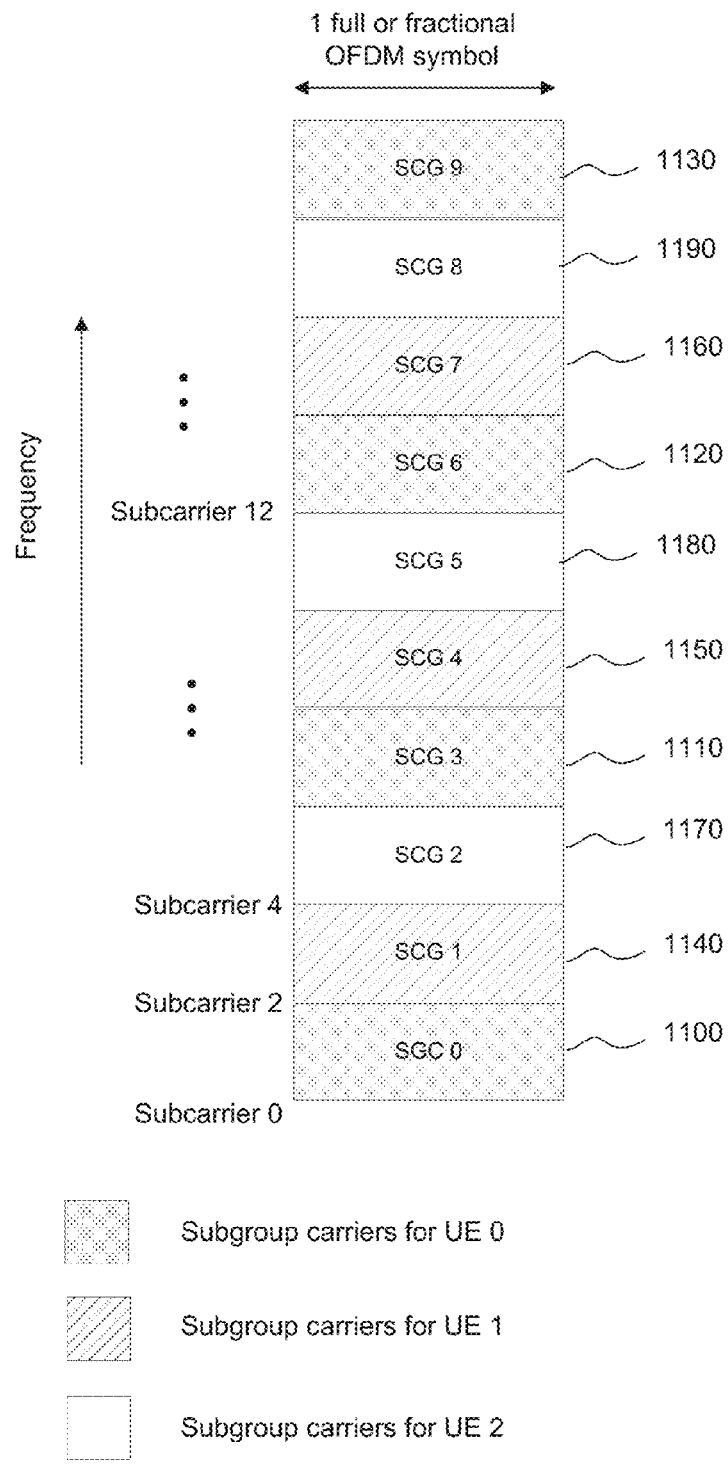
FIG. 11 schematically illustrates Interference Frequency Division Multiple Access (IFDMA) multiplexing of CTS signals in an LAA RTS/CTS procedure.

In one example as shown in the FIG. 11, two subcarriers are grouped to form a SCG and up to four SCGs out of the total of ten SCGs are assigned to each of three UEs. UE #0 is assigned to SCG 0 and every 3rd SCGs from SCG 0 (e.g. SCG 0, 3, 6, and 9 corresponding to frequency blocks 1100, 1110, 1120 and 1130 on the same OFDM symbol of the slot) since there are three UEs. As such, UE #1 is assigned to SCG 1, 4, and 7, corresponding to frequency blocks 1140, 1150 and 1160. The remaining three frequency blocks 1170, 1180 and 1190 are assigned to UE #2.

In another embodiment, CDMA can be used to multiplex CTSs to the same frequency band and time domain, in which each UE uses a different code that spans the entire frequency band. In particular, Zadoff-Chu (ZC) sequence or M-sequence or Hadamard sequence can be adopted for the CTS design.

In one option, ZC sequence can be employed for the CTS design. In particular, the sequence used for the CTS transmission can be generated by puncturing or cyclic extension of the ZC sequence. Let us define the number of subcarriers in the system bandwidth as $N_{SC}$, and the length of the ZC sequence as $N_{ZC}$. Note that $N_{ZC}$ can be a prime number. In one example, $N_{ZC}$ can be defined as the largest prime number such that $N_{ZC} < N_{SC}$ or the smallest prime number such that $N_{ZC} \geq N_{SC}$.

Note that the CTS sequence is defined by a cyclic shift α of a base sequence according to $$r_u^\alpha(n) = \exp(j\alpha n) \cdot \bar{r}_u^\alpha(n), \ 0 \leq n < N_{SC}$$

where $\bar{r}_u^{-\alpha}(n)$ is the base sequence and u is the root index for ZC sequence, which can be predefined or fixed in the specification or defined as a function of physical cell ID or a virtual cell ID. In the latter case, the virtual cell ID can be configured by higher layers.

Based on the above equation, multiple orthogonal CTS sequences can be generated from a single base sequence through different values of α. Note that to ensure orthogonality of the CTS transmission among multiple UEs, α can be defined as a function of UE identity or UE index as used for the RTS. In the latter case, the UE index can be configured by the dedicated UE specific RRC signaling. In one example, α can be defined as $$\alpha = (K_0 + \Delta_{CS} \cdot I_{UE}) \bmod N_{ZC}$$

Where $K_0$ is the starting cyclic shift offset, $\Delta_{CS}$ is the cyclic shift distance and $I_{UE}$ is the UE index. Note that $K_0$ and $\Delta_{CS}$ can be predefined or configured by higher layer via SIB or dedicated UE specific RRC signaling.

In the case when the ZC sequence length is less than the number of subcarrier within system bandwidth, i.e., $N_{ZC} < N_{SC}$, the base sequence can be generated by either puncturing or a cyclic extension of the ZC sequence. In one option, the base sequence can be given by a cyclic extension of the ZC sequence $x_u(n)$:

$$r_u^{-\alpha}(n) = x_u(n \bmod N_{ZC}), \ 0 \leq n < N_{SC}$$

In another option, the base sequence can be given by puncturing certain subcarrier in the both edge of the system bandwidth:

$$\tilde{r}_u^\alpha(n) = \begin{cases} x_u(n), & 0 \leq n < N_{ZC} \\ 0, & \text{otherwise} \end{cases}$$

Note that the ZC sequence is generated by $$x_u(m) = \exp\left(-\frac{j\pi u m(m+1)}{N_{ZC}}\right),$$

$$0 \leq m < N_{ZC}$$

In the case when the ZC sequence length is larger than the number of subcarrier within system bandwidth, i.e., $N_{ZC} \geq N_{SC}$, the base sequence can be generated by puncturing certain elements in the ZC sequence, $$r_u^{-\alpha}(n) = x_u(n), \ 0 \leq n < N_{SC}$$

In another embodiment, a combination of CDMA and/or FDMA and/or TDMA can be used to multiplex the transmission of CTS from multiple UEs. In one example, in the case when multiple fractional or full OFDM symbols are allocated for CTS transmission from multiple UEs, a combination of TDMA and FDMA can be considered for the multiplexing of the CTS signal from multiple UEs. For instance, CTS signal from one UE can be evenly distributed within the time and frequency dimensions.

In another example, a combination of CDMA and FDMA can be considered for the multiplexing of the CTS signal from multiple UEs. For instance, identical or distinct ZC sequences can be transmitted on each SCG allocated for one UE.

Multiplexed LAA CTS Design when X-Bit Information is Carried (X>1), where X is an Integer If more than 1 bit information is sent on LAA CTS from an UE, LAA CTS can be multiplexed using FDM, TDM, CDM, or combination of these schemes to send d number of modulated symbols per UE. When more than 1 bit information is transmitted within LAA CTS, reference symbols (RSs) per UE need to be inserted in the resource elements other than the resource allocated for the transmission of LAA CTS to ensure proper channel estimation. Coding, scrambling and associated procedures are not required when the CTS signal comprises only a single bit per UE.

Figure 12:
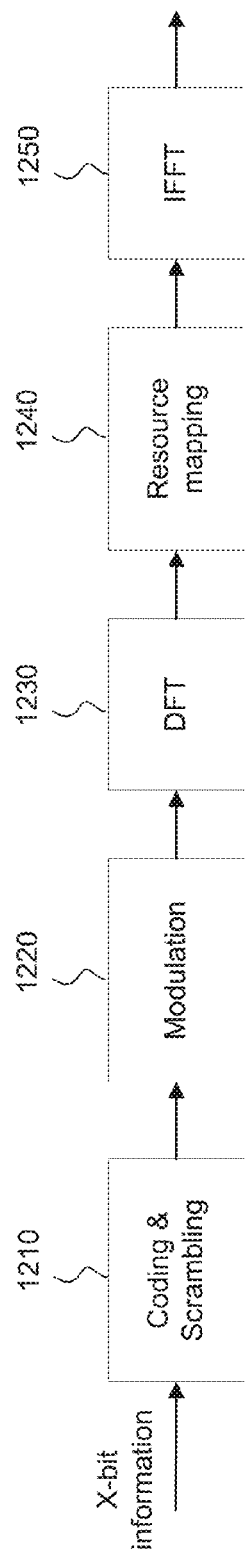
FIG. 12 schematically illustrates a CTS signal generation procedure according to embodiments where the CTS comprises one bit of information per UE.

FIG. 12 schematically illustrates processing performed on X-bits of information are carried to be carried by a CTS signal according to embodiments. The X-bit CTS signal generation process of FIG. 12 comprises sending the X-bit information through a coding and scrambling module 1210, a modulation module 1220, a Discrete Fourier Transform (DFT) module 1230, a resource mapping module 1240 and an Inverse Fast Fourier Transform (IFFT) module 1250.

Coding and Scrambling Module 1210

When transmitting the CTS signal on unlicensed carrier, CRC may or may not be appended after the payload. In the case when CRC is used, 8, 16 or 24 parity check bits can be calculated based on the payload and/or header and appended to the payload. As specified in the section 5.1.1 in 3GPP TS 36.212, one of the generator polynomials $g_{CRC8}(D)$, $g_{CRC16}(D)$, $g_{CRC24A}(D)$ and $g_{CRC24B}(D)$ may be adopted.

Subsequently, channel coding is applied for the transmission of CTS signal. In particular, either tail biting convolutional codes (TBCC) or turbo code (TC) or repetition code in the LTE specification can be adopted for channel coding. After the channel coding, rate matching is performed to fill out the available Res (resource elements) assigned for each UE.

After the channel coding and rate-matching, scrambling may or may not be performed in order to randomize the interference. In the LAA CTS design, similar scrambling procedure as in the existing LTE specification for PBCH can be applied. More specifically, the scrambling sequence can be initialized with a fixed value or defined as function of cell ID, and/or frame index and/or subframe index and/or OFDM symbol number.

Modulation Module 1220, DFT Module 1230 and IFFT Module 1250

To ensure robust reception of the LAA CTS, encoded bits can be modulated with either BPSK or QPSK.

Note that when generating the CTS signal, the DFT and IFFT operation as shown in the FIG. 12 can reuse the existing LTE specification procedures 3GPP TS 36.211.

Reference Symbol Generation

As mentioned above, to ensure proper channel estimation, reference symbols need to be inserted adjacent to the CTS data transmission. In particular, the reference signal sequence can be generated in the same way as defined in the section 6.10.1.1 in TS 36.211 for CRS or in the section 6.10.3.1 in TS 36.211 for UE-specific RS for AP $p \in \{7, 8, \ldots, v+6\}$.

Resource Mapping of Data and Reference Symbols by Resource Mapping Module 1240

In one embodiment, IFDMA scheme disclosed above can be modified to map d modulated symbols from UE(s) and insert reference symbols (RSs) to dedicated SCGs. K can be 12 as in the LTE PRB specification, and d modulated symbols from an UE are mapped to d SCGs and additional d SCGs are assigned to RSs for the UE. Then, $$N_{SCG} = \lfloor N_{sc}/12 \rfloor,$$

and $$N_{SCG}^{UE} = 2 \cdot d.$$

The maximum number of UEs that can be allocated in one OFDM symbol over the entire frequency band is $$M = \lfloor N_{SCG}/(2 \cdot d) \rfloor.$$

If different amount of resource is allocated for RSs, M will be reduced or increased accordingly. If M>L, additional full or fractional OFDM symbols can be allocated for LAA CTS.

There can be many options to allocate 2·d SCGs to the UE for data and RSs. In one option, data (i.e. modulated symbols) for the ith UE, i=0, 1, 2, . . . , M−1, is assigned to a set of SCGs that starts from 2·ith SCG, and spans to every 2·Mth SCG up to $N_{SCG}$−1th SCG:

$$S_{SCG\_data}^{UEi}=2 \cdot i+2 \cdot n \cdot M,$$

where n=0, 1, 2, . . . , $N_{SCG}^{UE}$/2−1. And, RSs for the ith UE is assigned to the SCGs next to data SCGs:

$$S_{SCG\_RS}^{UEi}=(2 \cdot i+1)+2 \cdot n \cdot M.$$

Figure 13:
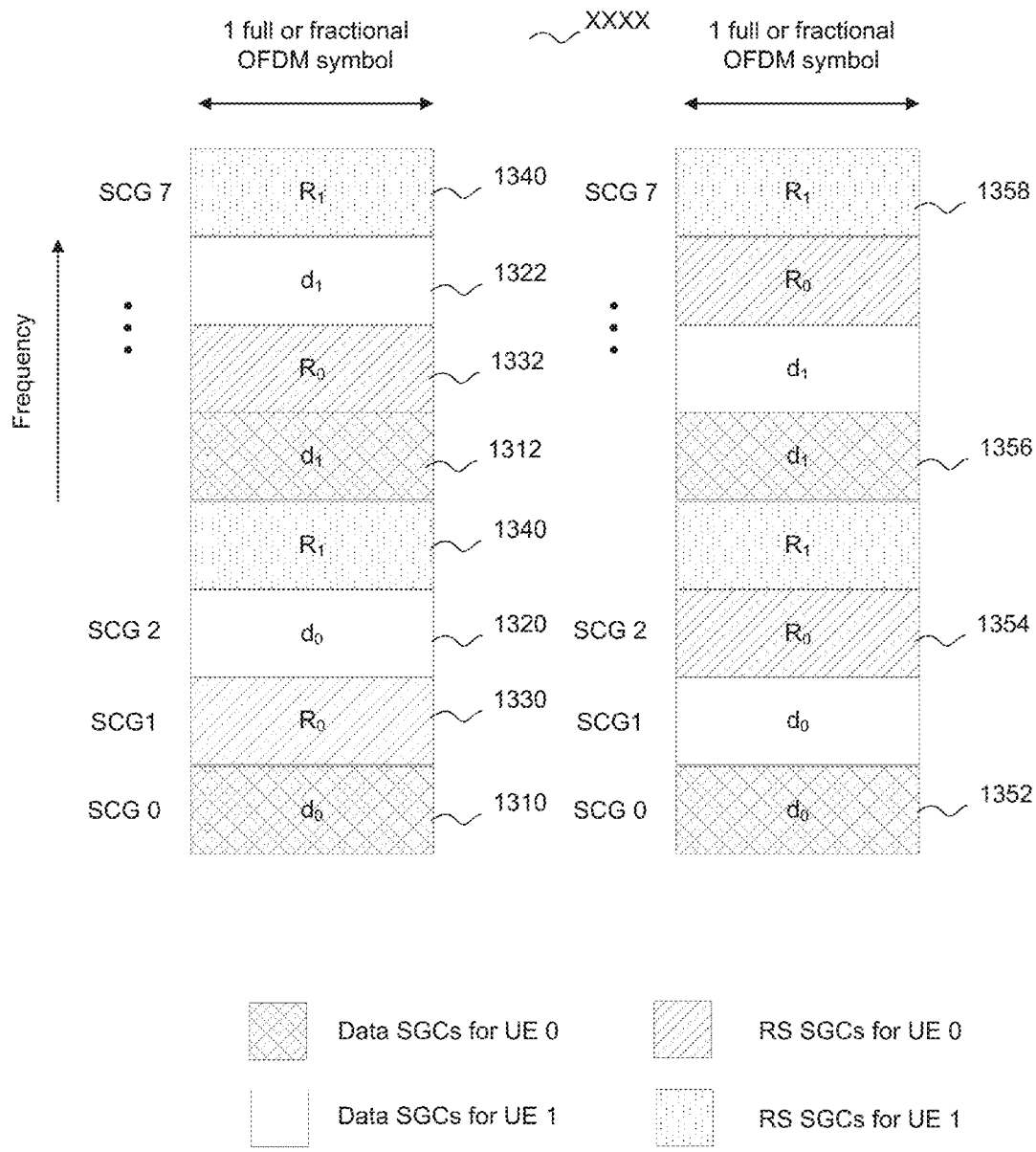
FIG. 13 schematically illustrates FIG. 12 schematically illustrates a CTS signal generation procedure according to embodiments where the CTS comprises more than one bit of information (multiple modulated symbols) per UE.

In one example as shown in the FIG. 13, two modulated symbols (data) are assigned to SCG #0 1310 and SCG #4 1312 for UE #0; and two modulated symbols are assigned to the different groups SCG #2 1320 and SGC #6 1322 for UE #1. Furthermore, two Reference Signals are assigned next to data SCGs for each to the two UEs. In particular, SCG #1 1330 and SGC #5 1332 are assigned to contain reference symbols for UE #0; and SCG #3 1340 and SCG #7 1342 are assigned to contain reference symbols for UE #2).

In another option, the ith UE, i=0, 1, 2, . . . , M−1, is assigned to a set of SCGs that starts from ith SCG, and spans to every Mth SCG up to $N_{SCG}$−1th SCG, and data and RS are alternatively allocated within the assigned SCGs:

$$S_{SCG\_data}^{UEi}=i+2 \cdot n \cdot M,$$

and $$S_{SCG\_RS}=i+(2 \cdot n+1) \cdot M,$$

where $N_{SCG}^{UE}$=2·d and n=0, 1, 2, . . . , $N_{SCG}^{UE}$/2−1. In one example shown in the right-hand symbol block of FIG. 6, UE #0 is assigned to SCG #0 1352, SCG #2 1354, SCG #4 1356, and SCG #6 1358, and data is sent on SCG #0 1352 and SCG #4 1356 and RSs on SCG #2 1354 and SCG #6 1358. In addition to equally distributed SCGs, it will be appreciated that in alternative embodiments different partitions among the SCGs and UEs can be used as well as different starting SCG starting positions for UEs.

Figure 14:
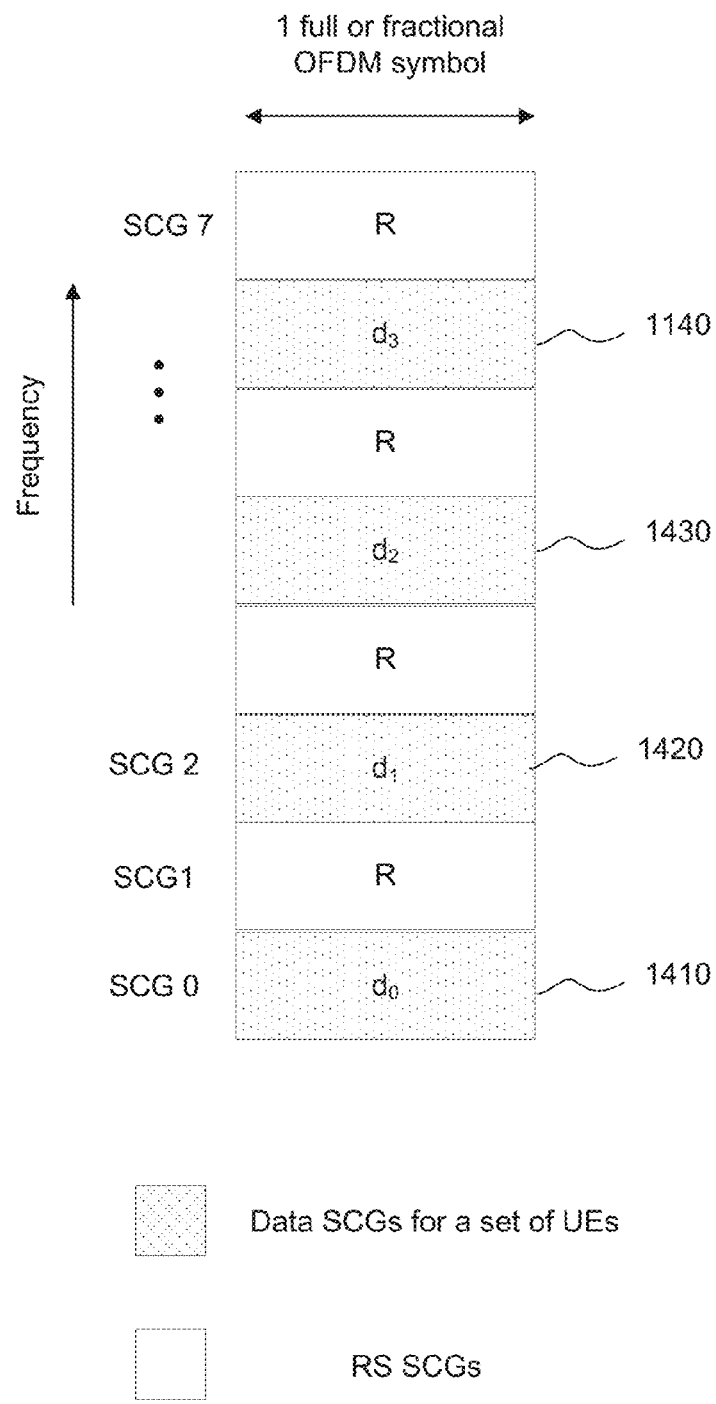
FIG. 14 schematically illustrates multiplexing of LAA CTS signals using a combination of IFDMA and Code Division Multiplexing according to embodiments.

In another embodiment, IFDMA scheme can be combined with CDM, where data SCGs and RS SCGs are shared among multiple UEs using different codes. There can be many ways to allocate a set of data and RS SCGs to UEs. The number of SCGs per group of UEs can be a function of CDMA code length or others. In simple case, data SCG and RS SCG can be alternated over entire band and all UEs share the SCGs using different codes. In one example as shown in FIG. 14, a set of UEs share data SCGs #0, 2, 4, and 6 corresponding respectively to blocks 1410*m* 1420, 1430 and 1440. The reference symbol occupy alternate blocks in the block comprising eight sub-carrier groups and spanning a fractional of single OFDM symbol in the slot of the radio frame. In general, the number of symbols spanned by the CTS signal will depend upon the number of UEs for which the signal is multiplexed.

In more complex case, a different subset of SCGs can be assigned to a different set of UEs and UEs within the same set share the SCGs. For example, the SCGs allocation that is shown for UE#0 in FIG. 13 can be shared among a group of UEs and the SCGs for UE #1 for another group of UEs.

Figure 15:
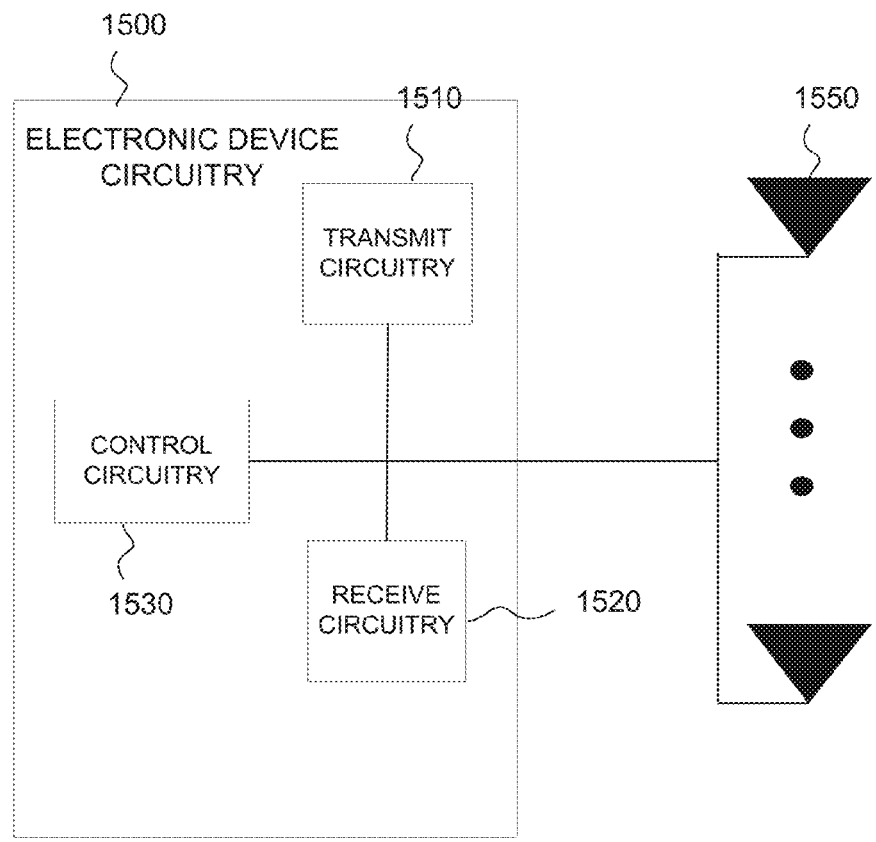
FIG. 15 schematically illustrates electronic device circuitry according to embodiments.

FIG. 15 illustrates electronic device circuitry 1500 that may be eNB circuitry, UE circuitry, or some other type of circuitry in accordance with various embodiments. In embodiments, the electronic device circuitry may be, or may be incorporated into or otherwise a part of, an eNB, a UE, or some other type of electronic device. In embodiments, the electronic device circuitry may include radio transmit circuitry 1510 and receive circuitry 1520 coupled to control circuitry 1530. In embodiments, the transmit and/or receive circuitry may be elements or modules of transceiver circuitry, as shown. The electronic device circuitry may be coupled with one or more plurality of antenna elements of one or more antennas 1550. The electronic device circuitry 1500 and/or the components of the electronic device circuitry may be configured to perform operations similar to those described elsewhere in this disclosure. In some embodiments, not shown, the electronic device circuitry may be distributed across or include elements of one or more electronic devices such as one or more UE(s), eNB(s), and/or some other electronic device(s).

In embodiments, the electronic device may be to operate on unlicensed spectrum. The transmit circuitry 1510, control circuitry 1530, and/or receive circuitry 1520 may be to reserve shared unlicensed spectrum with low latency in accordance with Licensed Assisted Access (LAA) Request-To-Send (RTS) and Clear-To-Send (CTS) procedure; wherein the reservation of the shared unlicensed spectrum includes generation of multiplexed LAA CTS for 1 bit information or more than 1 bit information.

As used herein, the term "circuitry" may refer to, be part of, or include an Application Specific Integrated Circuit (ASIC), an electronic circuit, a processor (shared, dedicated, or group), and/or memory (shared, dedicated, or group (that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In embodiments the electronic device circuitry of FIG. 15 may be configured to perform one or more processes such as the process of a module for performing reservation of shared unlicensed spectrum (not shown). The process may be a process of wireless communications operating on unlicensed spectrum. The process may include reserving shared unlicensed spectrum with low latency in accordance with Licensed Assisted Access (LAA) Request-To-Send (RTS) and Clear-To-Send (CTS) procedure; wherein the reserving includes generating multiplexed LAA CTS for 1 bit information and/or generating multiplexed LAA CTS for more than 1 bit information.

Figure 16:
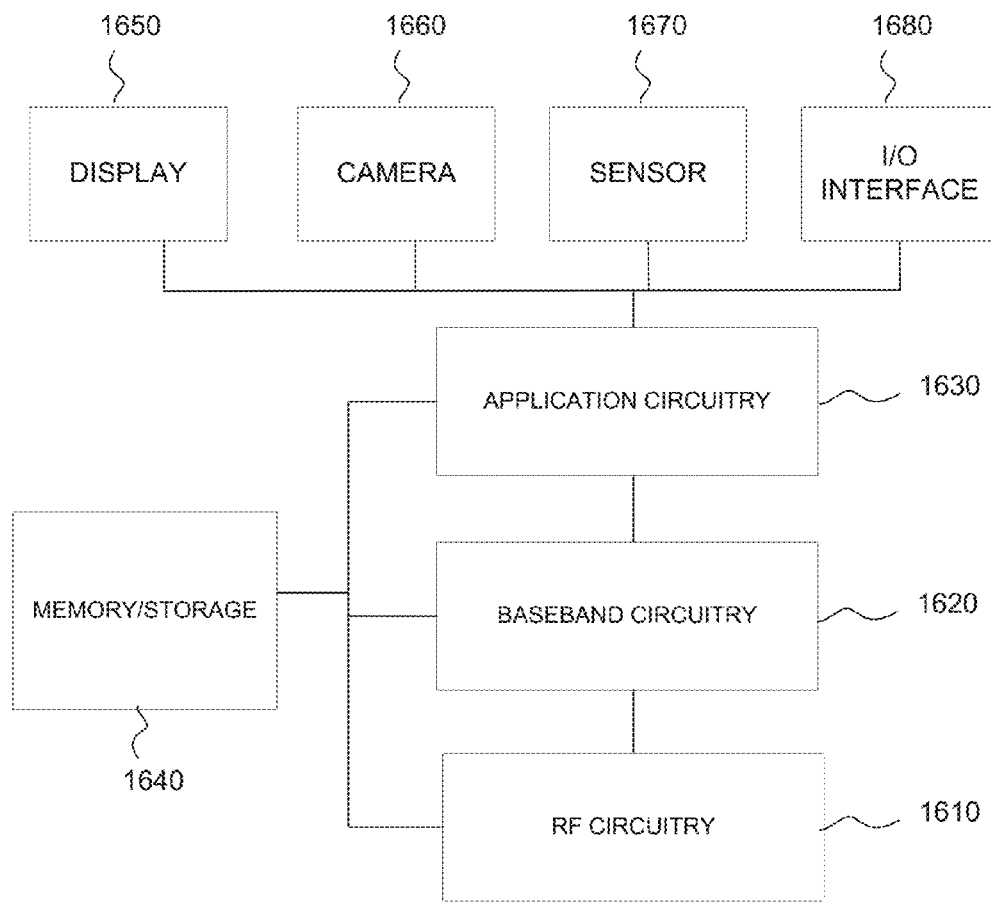
FIG. 16 schematically illustrates an example system according to embodiments.

Embodiments described herein may be implemented into a system using any suitably configured hardware and/or software. FIG. 16 illustrates, for one embodiment, an example system comprising radio frequency (RF) circuitry 1610, baseband circuitry 1620, application circuity 1630, memory/storage 1640, display 1650, camera 1660, sensor 1670, and input/output (I/O) interface 1680, coupled with each other at least as shown.

The application circuitry 1630 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 1620 may include circuitry such as, but not limited to, one or more single-core or multi-core processors. The processor(s) may include a baseband processor. The baseband circuitry 1620 may handle various radio control functions that enables communication with one or more radio networks via the RF circuitry. The radio control functions may include, but are not limited to, signal modulation, encoding, decoding, radio frequency shifting, etc. In some embodiments, the baseband circuitry 1620 may provide for communication compatible with one or more radio technologies. For example, in some embodiments, the baseband circuitry 1620 may support communication with an evolved universal terrestrial radio access network (EU-TRAN) and/or other wireless metropolitan area networks (WMAN), a wireless local area network (WLAN), a wireless personal area network (WPAN). (Embodiments in which the baseband circuitry is configured to support radio communications of more than one wireless protocol may be referred to as multi-mode baseband circuitry.

In various embodiments, baseband circuitry 1620 may include circuitry to operate with signals that are not strictly considered as being in a baseband frequency. For example, in some embodiments baseband circuitry may include circuitry to operate with signals having an intermediate frequency, which is between a baseband frequency and a radio frequency.

RF circuitry 1610 may enable communication with wireless networks using modulated electromagnetic radiation through a non-solid medium. In various embodiments, the RF circuitry may include switches, filters, amplifiers, etc. to facilitate the communication with the wireless network.

In various embodiments, RF circuitry 1610 may include circuitry to operate with signals that are not strictly considered as being in a radio frequency. For example, in some embodiments, RF circuitry 1610 may include circuitry to operate with signals having an intermediate frequency, which is between a baseband frequency and a radio frequency.

In various embodiments, transmit circuitry 1510, control circuitry 1530, and/or receive circuitry 1520 discussed or described herein may be embodied in whole or in part in one or more of the RF circuitry 161, the baseband circuitry 1620, and/or the application circuitry 1630. As used herein, the term "circuitry" may refer to, be part of, or include an Application Specific Integrated Circuit (ASIC), an electronic circuit, a processor) shared, dedicated, or group), and/or memory (shared, dedicated, or group (that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 1620, the application circuitry 1630, and/or the memory/storage 1640 may be implemented together on a system on a chip (SOC).

Memory/storage may be used to load and store data and/or instructions, for example, for system. Memory/storage for one embodiment may include any combination of suitable volatile memory (e.g., dynamic random access memory (DRAM)) and/or non-volatile memory (e.g., Flash memory).

In various embodiments, the I/O interface 1680 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB (port, an audio jack, and a power supply interface.

In various embodiments sensor 1670 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1650 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

Figure 17:
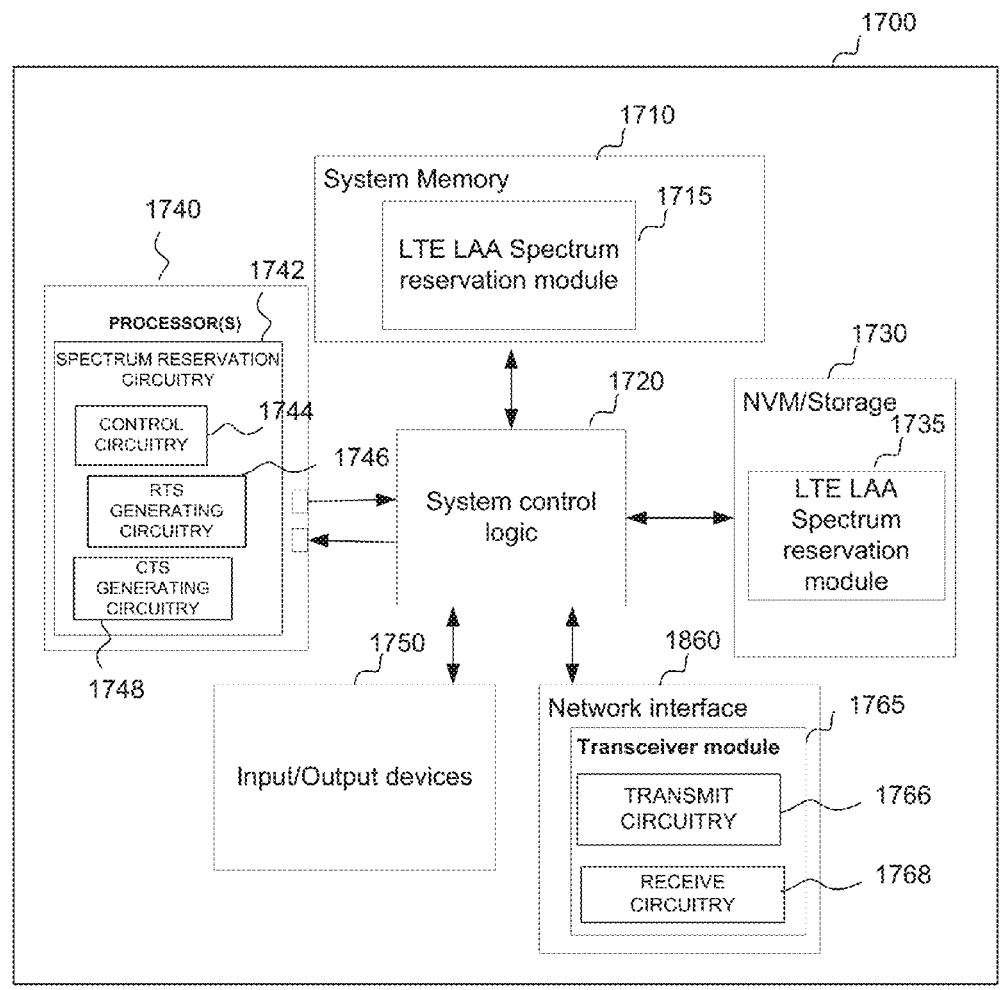
FIG. 17 a further example system according to embodiments.

FIG. 17 illustrates an example system 1200 according to some embodiments. System 1700 includes one or more processor(s) 1740, system control logic 1720 coupled with at least one of the processor(s) 1740, system memory 1710 coupled with system control logic 1720, non-volatile memory (NVM)/storage 1730 coupled with system control logic 1720, and a network interface 1760 coupled with system control logic 1720. The system control logic 1720 may also be coupled to Input/Output devices 1750.

Processor(s) 1740 may include one or more single-core or multi-core processors. Processor(s) 1740 may include any combination of general-purpose processors and dedicated processors (e.g., graphics processors, application processors, baseband processors, etc.). Processors 1740 may be operable to carry out the above described methods, using suitable instructions or programs (i.e. operate via use of processor, or other logic, instructions). The instructions may be stored in system memory 1710, as system memory portion (radio frame configuration module) 1215, or additionally or alternatively may be stored in (NVM)/storage 1730, as NVM instruction portion 1735. LTE LAA spectrum reservation module 1715 may include program instructions to cause reservation of unlicensed spectrum via exchange of RTS/CTS signals on an unlicensed carrier, for example, enabling a one to many point connection to be established on LTE LAA via multiplexing of CTS signals and/or RTS signals from a plurality of UEs. Radio frame configuration module 1715 may form part of a communication section, including circuitry to cause transmission of an RTS signal and to receive a CTS signal (possibly multiplexed) in response to the RTS signal. The circuitry may also be configured to receive an RTs signal and to send a CTS signal in response depending upon whether the medium is busy/idle.

Processors(s) 1240 may be configured to execute the embodiments of FIGS. 1 to 14. The processor(s) may comprise spectrum reservation circuitry 1742 comprising control circuitry 1744, RTS generating circuitry 1746 and CTS generating circuitry 1748. A transceiver module 1765 comprises transmit circuitry 1766 and receive circuitry 1768 for transmitting and/or receiving RTS/CTS signals on unlicensed spectrum. It will be appreciated that the LTE LAA spectrum reservation functionality may be distributed or allocated in different ways across the system involving one or more of the processor(s) 1740, transceiver module 1765, system memory 1710 and NVM/Storage 1730.

System control logic 1720 for one embodiment may include any suitable interface controllers to provide for any suitable interface to at least one of the processor(s) 1740 and/or to any suitable device or component in communication with system control logic 1720.

System control logic 1720 for one embodiment may include one or more memory controller(s) to provide an interface to system memory 1710. System memory 1710 may be used to load and store data and/or instructions, for example, for system 1700. System memory 1710 for one embodiment may include any suitable volatile memory, such as suitable dynamic random access memory (DRAM), for example.

NVM/storage 1730 may include one or more tangible, non-transitory computer-readable media used to store data and/or instructions, for example. Transitory computer-readable media may be used. NVM/storage 1230 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1730 may include a storage resource physically part of a device on which the system 1700 is installed or it may be accessible by, but not necessarily a part of, the device. For example, the NVM/storage 1730 may be accessed over a network via the network interface 1760.

System memory 1210 and NVM/storage 1230 may respectively include, in particular, temporal and persistent copies of, for example, the instructions portion 1715. The LTE LAA spectrum reservation module 1715 may include instructions that when executed by at least one of the processor(s) 1740 result in the system 1700 implementing one or more of methods of any embodiment, as described herein. In some embodiments, instructions 1715, or hardware, firmware, and/or software components thereof, may additionally/alternatively be located in the system control logic 1720, the network interface 1760, and/or the processor(s) 1740.

The transceiver module 1765 provides a radio interface for system 1200 to communicate over one or more network(s) (e.g. wireless communication network) and/or with any other suitable device. The transceiver 1765 may perform the various communicating, transmitting and receiving described in the various embodiments, and may include a transmitter section and a receiver section. In various embodiments, the transceiver 1765 may be integrated with other components of system 1700. For example, the transceiver 1765 may include a processor of the processor(s) 1740, memory of the system memory 1710, and NVM/Storage of NVM/Storage 1730. Network interface 1260 may include any suitable hardware and/or firmware.

Network interface 1760 may be operatively coupled to a plurality of antennas to provide a multiple input, multiple output radio interface. Network interface 1760 for one embodiment may include, for example, a network adapter, a wireless network adapter, a telephone modem, and/or a wireless modem. For example, where system 1700 is an eNB, network interface 1760 may include an Ethernet interface, an S1-MME interface and/or an S1-U interface. The system 1700 of FIG. 17 may be implemented in a UE, but may alternatively be implemented in a picocell, femtocell or relay node for the purposes of implementing peer-to-peer communication and resource allocation.

For one embodiment, at least one of the processor(s) 1740 may be packaged together with logic for one or more controller(s) of system control logic 1720. For one embodiment, at least one of the processor(s) 1740 may be packaged together with logic for one or more controllers of system control logic 1720 to form a System in Package (SiP). For one embodiment, at least one of the processor(s) 1740 may be integrated on the same die with logic for one or more controller(s) of system control logic 1720. For one embodiment, at least one of the processor(s) 1740 may be integrated on the same die with logic for one or more controller(s) of system control logic 1720 to form a System on Chip (SoC). Each of the processors 1240 may include an input for receiving data and an output for outputting data.

In various embodiments, the I/O devices 1750 may include user interfaces designed to enable user interaction with the system 1700, peripheral component interfaces designed to enable peripheral component interaction with the system 1700, and/or sensors designed to determine environmental conditions and/or location information related to the system 1700.

Figure 18:
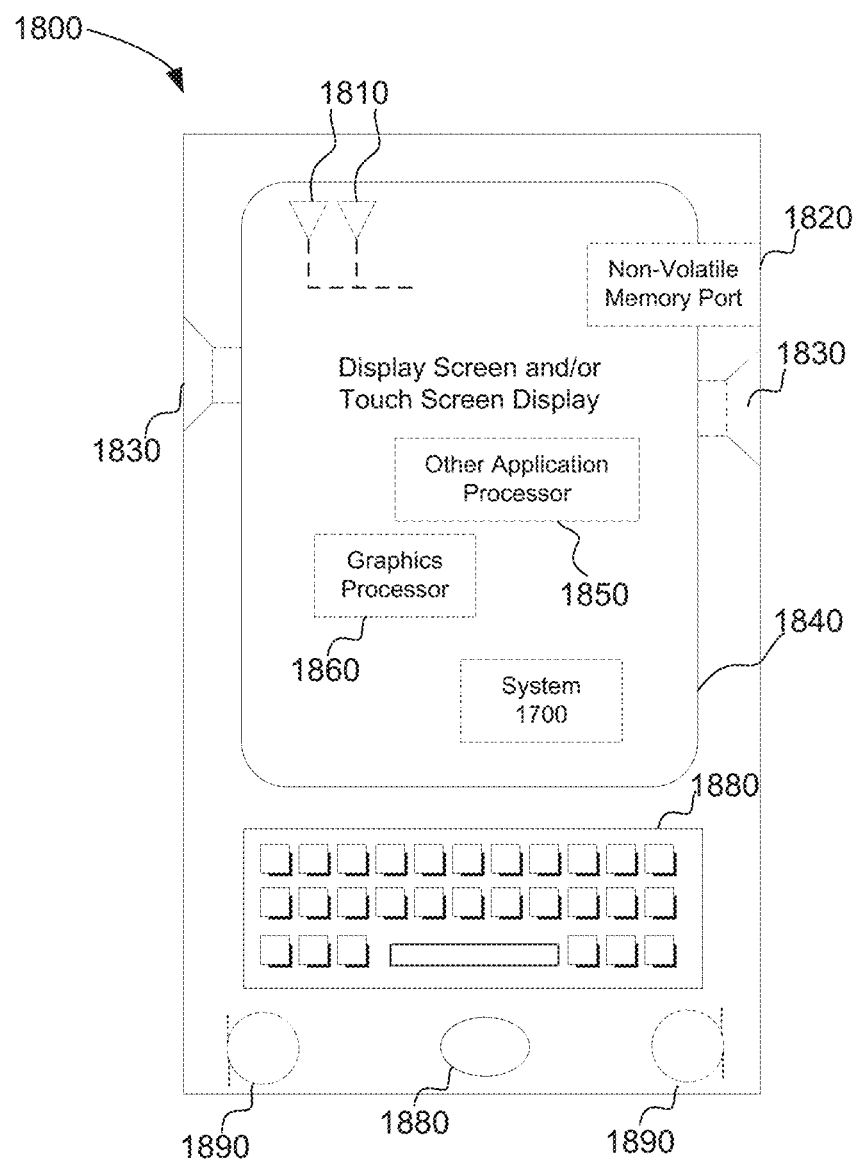
FIG. 18 an embodiment in which the system of FIG. 17 is implemented in a wireless device.

FIG. 18 shows an embodiment in which the system 1700 of FIG. 17 is implemented in a wireless device 1700, such as user equipment (UE), a mobile station (MS), a mobile wireless device, a mobile communication device, a tablet, a handset, or other type of wireless device. The wireless device can include one or more antennas 1810 configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The device is capable of performing D2D communication with other proximal wireless devices both when in-coverage and out-of-coverage with respect to the wireless cellular network. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 1800 of FIG. 18 also provides an illustration of a microphone 1890 and one or more speakers 1830 that can be used for audio input and output from the wireless device. In various embodiments, the user interfaces could include, but are not limited to, a display 1840 (e.g., a liquid crystal display, a touch screen display, etc.), a speaker 1830, a microphone 1890, one or more cameras 1880 (e.g., a still camera and/or a video camera), a flashlight (e.g., a light emitting diode flash), and a keyboard 1870.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1760 to communicate with components of a positioning network, e.g., a global positioning system (GPS) satellite.

In various embodiments, the system 1700 may be a mobile computing device such as, but not limited to, a laptop computing device, a tablet computing device, a netbook, a mobile phone, etc. In various embodiments, system 1700 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. Program instructions may be provided on a non-transitory medium or via a transitory medium.

EXAMPLES

Example 1 may include a method of wireless communications operating on unlicensed spectrum, comprising: reserving, by one or more electronic devices, shared unlicensed spectrum with low latency in accordance with Licensed Assisted Access (LAA) Request-To-Send (RTS) and Clear-To-Send (CTS) procedure; wherein the reserving includes generating, by the one or more electronic devices, multiplexed LAA CTS for 1 bit information and/or generating, by the one or more electronic devices, multiplexed LAA CTS for more than 1 bit information.

Example 2 may include the method of example 1 or some other example herein, wherein the method of reserving shared unlicensed spectrum with low latency includes: reserving, by the one or more electronic devices, shared unlicensed spectrum around user equipments (UEs) upon successful reception of LAA RTS, transmitted from an evolved NodeB (eNB) via unlicensed spectrum, if the channel is available, by transmitting either multiplexed LAA CTS or LAA CTS that follows WiFi frame structure with modifications to the existing fields via unlicensed spectrum from the UE; transmitting, by the one or more electronic devices, downlink scheduling and control information, i.e. physical downlink control channel (EPDCCH) and/or enhanced PDCCH (ePDCCH), and data via unlicensed spectrum from the eNB only to a set of UEs which send LAA CTS; wherein the same or similar principal should be applied in uplink channel reservation operation.

Example 3 may include the method of example 2 or some other example herein, wherein LAA RTS frame structure can either be the same as the one in WiFi with modifications to the existing fields or have a new frame structure designed for LAA operation; and/or wherein LAA CTS frame structure can either be the same as the one in WiFi with modifications to the existing fields or have a new frame structure designed for LAA operation.

Example 4 may include the method of example 3 or some other example herein, wherein if LAA RTS follows WiFi RTS frame structure, it can leave critical RTS fields unchanged that WiFi capable UEs need to decode in order for them to set Network Allocation Vector (NAV) but alter non-critical fields to suit LAA operation; and/or wherein if LAA CTS follows WiFi CTS frame structure, it can leave critical CTS fields unchanged that WiFi capable UEs need to decode in order for them to set Network Allocation Vector (NAV) but alter non-critical fields to suit LAA operation.

Example 5 may include the method of example 4 or some other example herein, wherein LAA RTS keeps critical WiFi RTS fields such as Frame Control, Duration and FCS; wherein LAA RTS redefines non-critical fields such as Receiver address and Transmitter address; wherein LAA CTS keeps critical WiFi CTS fields such as Frame Control, Duration and FCS; and/or wherein LAA CTS redefines non-critical fields such as Receiver address.

Example 6 may include the method of example 5 or some other example herein, wherein the 6 bytes of LAA RTS that corresponds to the Receiver Address field of WiFi RTS frame structure can be redefined to address a LAA UE or a set of UEs, where the new address scheme can identify LAA UEs and not collide with WiFi address range; and/or wherein the address field can indicate UEs in unicast, multicast or broadcast identifiers or indexes.

Example 7 may include the method of example 5 or some other example herein, wherein the 6 bytes of LAA RTS that corresponds to the Transmitter Address field of WiFi RTS frame structure can be redefined solely for LAA operation, where it can include parameters such as total number of RTSs, whether this RTS is the final RTS or the next RTS is coming, LAA transmitter identifier or index, and/or CTS transmission start time.

Example 8 may include the method of example 5 or some other example herein, wherein the 6 bytes of LAA CTS that corresponds to the Receiver Address field of WiFi CTS frame structure can be redefined to address a LAA UE or a set of UEs and other information for LAA operation such as ACK; and/or wherein LAA UEs not address in LAA RTS will honor the LAA CTS, but LAA UEs addressed in LAA RTS will not honor the LAA CTS and proceed to LAA CTS transmission.

Example 9 may include the method of example 3 or some other example herein, wherein LAA RTS that follows WiFi RTS frame structure can be used with LAA CTS that follows WiFi CTS frame structure or a new multiplexed CTS; and/or wherein LAA RTS that has a new frame structure can be used with LAA CTS that follows WiFi CTS frame structure or a new multiplexed CTS.

Example 10 may include the method of example 3 or some other example herein, wherein for a single UE scheduling, a pair of LAA RTS and LAA CTS is exchanged; and/or wherein for multiple UE scheduling, one or more LAA RTSs and LAA CTSs can be exchanged in many different order, whose example includes (1) one or more LAA RTSs are transmitted in a sequence first before either multiplexed or sequential LAA CTS transmissions start from UEs or (2) the next RTS is transmitted after the previous RTS/CTS round is over.

Example 11 may include the method of example 2 or some other example herein, wherein the interval time between LAA RTS and LAA CTS transmission and/or between LAA CTS and (E)PDCCH/DATA may be predefined in the specification or provided by LAA RTS, LAA control message or higher layer via dedicated RRC signaling; and/or wherein the interval time may be configured to be equal to WLAN SIFS or less than DIFS; and/or wherein the interval time can be specified such that LAA CTS transmission need not be aligned to LTE subframe boundary.

Example 12 may include the method of example 2 or some other example herein, wherein LAA CTS can be multiplexed or transmitted asynchronously for multiple UEs whose UE identifier or UE index is included in LAA RTS and who determine that the unlicensed spectrum is available after performing clear channel assessment (CCA) or extended CCA; and/or wherein multiplexed LAA CTS is transmitted simultaneously by multiple UEs.

Example 13 may include the method of example 12 or some other example herein, wherein multiplexed LAA CTS is transmitted in one or multiple fractional or full OFDM symbols.

Example 14 may include the method of example 1 or some other example herein, wherein multiplexed LAA CTS carries 1 bit information for each UE which is indicated in RTS; and/or wherein 1 bit information in multiplexed LAA CTS can correspond to ACK or the duration of channel reservation or LAA burst; and/or wherein if 1 bit carries duration information, the duration range that corresponds to value 0 and 1 each can be predefined in the specification or carried in LAA RTS, LAA preamble or RRC signaling; and/or wherein whether the 1 bit information corresponds to ACK or duration can be carried in LAA RTS, LAA preamble or RRC signaling; and/or wherein UE does not transmit the CTS signal when it detects the unlicensed carrier is busy.

Example 15 may include the method of example 14 or some other example herein, wherein LAA CTS for 1 bit information can be multiplexed by using IFDMA that allocates each UE to a different set of SCGs in the frequency domain, either by equally distributed SCGs or different partitions among SCGs and UEs; and/or wherein a set of SCGs assigned to the ith UE is defined as $S_{SCG}^{UE_i}=i+n\cdot L$ for equally distributed case.

Example 16 may include the method of example 14 or some other example herein, wherein LAA CTS for 1 bit information can be multiplexed by using CDMA, in which each UE uses a different code that spans the entire frequency band; and/or wherein Zadoff-Chu (ZC) sequence, M-sequence or Hadamard sequence can be used.

Example 17 may include the method of example 16 or some other example herein, wherein sequence used for the CTS transmission is generated by puncturing or cyclic extension of the ZC sequence; and/or wherein the sequence is defined by a cyclic shift of a base sequence; wherein root index for the base sequence can be predefined or fixed in the specification or defined as a function of physical cell ID or a virtual cell ID; and/or wherein the cyclic shift can be defined as a function of UE identity or UE index as used for the RTS.

Example 18 may include the method of example 14 or some other example herein, wherein LAA CTS for 1 bit information can be multiplexed by using a combination of CDMA and/or FDMA and/or TDMA.

Example 19 may include the method of example 1 or some other example herein, wherein multiplexed LAA CTS carries more than 1 bit information for each UE which is indicated in RTS, where the duration of channel reservation or LAA burst is included in the CTS; and/or wherein UE does not transmit the CTS signal when it detects the unlicensed carrier is busy.

Example 20 may include the method of example 19 or some other example herein, wherein LAA CTS may or may not include Cyclic Redundancy Check (CRC); wherein either tail biting convolutional codes (TBCC) or turbo code (TC) or repetition code can be used for the channel coding for the LAA CTS signal; and/or wherein rate matching is performed after the channel coding to fill out the available REs assigned for each UE.

Example 21 may include the method of example 19 or some other example herein, wherein scrambling is performed after the channel coding and rate-matching; wherein the scrambling sequence can be initialized based on a function of at least one of: a physical cell ID, frame index, subframe index and OFDM symbol number; wherein either BPSK or QPSK is used for the modulation of the LAA CTS;

and/or wherein DFT, resource mapping and IFFT are used for the generation of the LAA CTS.

Example 22 may include the method of example 19 or some other example herein, wherein the existing CRS or UE specific RS sequence generation is reused for the reference symbol generation for LAA CTS.

Example 23 may include the method of example 19 or some other example herein, wherein IFDMA scheme is defined to allocate dedicated data SCGs and RS SCGs to the UEs for more than 1 bit LAA CTS transmission; and/or wherein each modulated symbol for LAA CTS is mapped to each data SCG assigned to the UE.

Example 24 may include the method of example 23 or some other example herein, wherein a set of equally distributed SCGs are assigned for data SCG for the UE and RS SCGs for the UE is allocated to be adjacent to those data SCGs for the UE.

Example 25 may include the method of example 23 or some other example herein, wherein a set of equally spaced SCGs are assigned to the UE, and data and RS are alternatively assigned to the allocated SCGs.

Example 26 may include the method of example 19 or some other example herein, wherein IFDMA scheme combined with CDMA is defined to transmit more than 1 bit LAA CTS on shared data SCGs and RS SCGs among multiple UEs by using different CDM codes.

Example 27 may include the method of example 26 or some other example herein, wherein data SCG and RS SCG can be alternatively allocated over entire frequency band and all UEs share the SCGs using different CDM codes.

Example 28 may include the method of example 26 or some other example herein, wherein a different subset of SCGs can be assigned to a different set of UEs and UEs within the same set share the SCGs by using CDM codes.

Example 29 may include the method of example 1 or some other example herein, wherein the one or more electronic devices include one or more of an evolved NodeB (eNB), a user equipment (UE), and/or some other electronic device.

Example 30 may include one or more electronic devices comprising: transmit circuitry, control circuitry, and/or receive circuitry to operate on unlicensed spectrum, the transmit circuitry, control circuitry, and/or receive circuitry to: reserve shared unlicensed spectrum with low latency in accordance with Licensed Assisted Access (LAA) Request-To-Send (RTS) and Clear-To-Send (CTS) procedure; wherein the reservation of the shared unlicensed spectrum includes generation of multiplexed LAA CTS for 1 bit information or more than 1 bit information.

Example 31 may include the one or more electronic devices of example 30 or some other example herein, wherein the reservation of the shared unlicensed spectrum with low latency includes: reserve shared unlicensed spectrum around user equipments (UEs) upon successful reception of LAA RTS, transmitted from an evolved NodeB (eNB) via unlicensed spectrum, if the channel is available, by transmission of either multiplexed LAA CTS or LAA CTS that follows WiFi frame structure with modifications to the existing fields via unlicensed spectrum from the UE; transmit downlink scheduling and control information, i.e. physical downlink control channel (EPDCCH) and/or enhanced PDCCH (ePDCCH), and data via unlicensed spectrum from the eNB only to a set of UEs which send LAA CTS; wherein the same or similar principal should be applied in uplink channel reservation operation.

Example 32 may include the one or more electronic devices of example 31 or some other example herein, wherein LAA RTS frame structure can either be the same as the one in WiFi with modifications to the existing fields or have a new frame structure designed for LAA operation; and/or wherein LAA CTS frame structure can either be the same as the one in WiFi with modifications to the existing fields or have a new frame structure designed for LAA operation.

Example 33 may include the one or more electronic devices of example 32 or some other example herein, wherein if LAA RTS follows WiFi RTS frame structure, it can leave critical RTS fields unchanged that WiFi capable UEs need to decode in order for them to set Network Allocation Vector (NAV) but alter non-critical fields to suit LAA operation; and/or wherein if LAA CTS follows WiFi CTS frame structure, it can leave critical CTS fields unchanged that WiFi capable UEs need to decode in order for them to set Network Allocation Vector (NAV) but alter non-critical fields to suit LAA operation.

Example 34 may include the one or more electronic devices of example 33 or some other example herein, wherein LAA RTS keeps critical WiFi RTS fields such as Frame Control, Duration and FCS; wherein LAA RTS redefines non-critical fields such as Receiver address and Transmitter address; wherein LAA CTS keeps critical WiFi CTS fields such as Frame Control, Duration and FCS; and/or wherein LAA CTS redefines non-critical fields such as Receiver address.

Example 35 may include the one or more electronic devices of example 34 or some other example herein, wherein the 6 bytes of LAA RTS that corresponds to the Receiver Address field of WiFi RTS frame structure can be redefined to address a LAA UE or a set of UEs, where the new address scheme can identify LAA UEs and not collide with WiFi address range; and/or wherein the address field can indicate UEs in unicast, multicast or broadcast identifiers or indexes.

Example 36 may include the one or more electronic devices of example 34 or some other example herein, wherein the 6 bytes of LAA RTS that corresponds to the Transmitter Address field of WiFi RTS frame structure can be redefined solely for LAA operation, where it can include parameters such as total number of RTSs, whether this RTS is the final RTS or the next RTS is coming, LAA transmitter identifier or index, and/or CTS transmission start time.

Example 37 may include the one or more electronic devices of example 34 or some other example herein, wherein the 6 bytes of LAA CTS that corresponds to the Receiver Address field of WiFi CTS frame structure can be redefined to address a LAA UE or a set of UEs and other information for LAA operation such as ACK; and/or wherein LAA UEs not address in LAA RTS will honor the LAA CTS, but LAA UEs addressed in LAA RTS will not honor the LAA CTS and proceed to LAA CTS transmission.

Example 38 may include the one or more electronic devices of example 32 or some other example herein, wherein LAA RTS that follows WiFi RTS frame structure can be used with LAA CTS that follows WiFi CTS frame structure or a new multiplexed CTS; and/or wherein LAA RTS that has a new frame structure can be used with LAA CTS that follows WiFi CTS frame structure or a new multiplexed CTS.

Example 39 may include the one or more electronic devices of example 32 or some other example herein, wherein for a single UE scheduling, a pair of LAA RTS and LAA CTS is exchanged; and/or wherein for multiple UE scheduling, one or more LAA RTSs and LAA CTSs can be exchanged in many different order, whose example includes (1) one or more LAA RTSs are transmitted in a sequence first before either multiplexed or sequential LAA CTS transmissions start from UEs or (2) the next RTS is transmitted after the previous RTS/CTS round is over.

Example 40 may include the one or more electronic devices of example 31 or some other example herein, wherein the interval time between LAA RTS and LAA CTS transmission and/or between LAA CTS and (E)PDCCH/DATA may be predefined in the specification or provided by LAA RTS, LAA control message or higher layer via dedicated RRC signaling; and/or wherein the interval time may be configured to be equal to WLAN SIFS or less than DIFS; and/or wherein the interval time can be specified such that LAA CTS transmission need not be aligned to LTE subframe boundary.

Example 41 may include the one or more electronic devices of example 31 or some other example herein, wherein LAA CTS can be multiplexed or transmitted asynchronously for multiple UEs whose UE identifier or UE index is included in LAA RTS and who determine that the unlicensed spectrum is available after performing clear channel assessment (CCA) or extended CCA; and/or wherein multiplexed LAA CTS is transmitted simultaneously by multiple UEs.

Example 42 may include the one or more electronic devices of example 41 or some other example herein, wherein multiplexed LAA CTS is transmitted in one or multiple fractional or full OFDM symbols.

Example 43 may include the one or more electronic devices of example 30 or some other example herein, wherein multiplexed LAA CTS carries 1 bit information for each UE which is indicated in RTS; and/or wherein 1 bit information in multiplexed LAA CTS can correspond to ACK or the duration of channel reservation or LAA burst; and/or wherein if 1 bit carries duration information, the duration range that corresponds to value 0 and 1 each can be predefined in the specification or carried in LAA RTS, LAA preamble or RRC signaling; and/or wherein whether the 1 bit information corresponds to ACK or duration can be carried in LAA RTS, LAA preamble or RRC signaling; and/or wherein UE does not transmit the CTS signal when it detects the unlicensed carrier is busy.

Example 44 may include the one or more electronic devices of example 43 or some other example herein, wherein LAA CTS for 1 bit information can be multiplexed by using IFDMA that allocates each UE to a different set of SCGs in the frequency domain, either by equally distributed SCGs or different partitions among SCGs and UEs; and/or wherein a set of SCGs assigned to the th UE is defined as $S_{SCG}^{UE_i}=i+n \cdot L$ for equally distributed case.

Example 45 may include the one or more electronic devices of example 43 or some other example herein, wherein LAA CTS for 1 bit information can be multiplexed by using CDMA, in which each UE uses a different code that spans the entire frequency band; and/or wherein Zadoff-Chu (ZC) sequence, M-sequence or Hadamard sequence can be used.

Example 46 may include the one or more electronic devices of example 45 or some other example herein, wherein sequence used for the CTS transmission is generated by puncturing or cyclic extension of the ZC sequence; and/or wherein the sequence is defined by a cyclic shift of a base sequence; wherein root index for the base sequence can be predefined or fixed in the specification or defined as a function of physical cell ID or a virtual cell ID; and/or wherein the cyclic shift can be defined as a function of UE identity or UE index as used for the RTS.

Example 47 may include the one or more electronic devices of example 43 or some other example herein, wherein LAA CTS for 1 bit information can be multiplexed by using a combination of CDMA and/or FDMA and/or TDMA.

Example 47 may include the one or more electronic devices of example 30 or some other example herein, wherein multiplexed LAA CTS carries more than 1 bit information for each UE which is indicated in RTS, where the duration of channel reservation or LAA burst is included in the CTS; and/or wherein UE does not transmit the CTS signal when it detects the unlicensed carrier is busy.

Example 48 may include the one or more electronic devices of example 47 or some other example herein, wherein LAA CTS may or may not include Cyclic Redundancy Check (CRC); wherein either tail biting convolutional codes (TBCC) or turbo code (TC) or repetition code can be used for the channel coding for the LAA CTS signal; and/or wherein rate matching is performed after the channel coding to fill out the available REs assigned for each UE.

Example 49 may include the one or more electronic devices of example 47 or some other example herein, wherein scrambling is performed after the channel coding and rate-matching; wherein the scrambling sequence can be initialized based on a function of at least one of: a physical cell ID, frame index, subframe index and OFDM symbol number; wherein either BPSK or QPSK is used for the modulation of the LAA CTS; and/or wherein DFT, resource mapping and IFFT are used for the generation of the LAA CTS.

Example 50 may include the one or more electronic devices of example 47 or some other example herein, wherein the existing CRS or UE specific RS sequence generation is reused for the reference symbol generation for LAA CTS.

Example 51 may include the one or more electronic devices of example 47 or some other example herein, wherein IFDMA scheme is defined to allocate dedicated data SCGs and RS SCGs to the UEs for more than 1 bit LAA CTS transmission; and/or wherein each modulated symbol for LAA CTS is mapped to each data SCG assigned to the UE.

Example 52 may include the one or more electronic devices of example 51 or some other example herein, wherein a set of equally distributed SCGs are assigned for data SCG for the UE and RS SCGs for the UE is allocated to be adjacent to those data SCGs for the UE.

Example 53 may include the one or more electronic devices of example 51 or some other example herein, wherein a set of equally spaced SCGs are assigned to the UE, and data and RS are alternatively assigned to the allocated SCGs.

Example 54 may include the one or more electronic devices of example 47 or some other example herein, wherein IFDMA scheme combined with CDMA is defined to transmit more than 1 bit LAA CTS on shared data SCGs and RS SCGs among multiple UEs by using different CDM codes.

Example 55 may include the one or more electronic devices of example 54 or some other example herein, wherein data SCG and RS SCG can be alternatively allocated over entire frequency band and all UEs share the SCGs using different CDM codes.

Example 56 may include the one or more electronic devices of example 54 or some other example herein, wherein a different subset of SCGs can be assigned to a different set of UEs and UEs within the same set share the SCGs by using CDM codes.

Example 57 may include the one or more electronic devices of example 30 or some other example herein, wherein the one or more electronic devices include one or more of an evolved NodeB (eNB), a user equipment (UE), and/or some other electronic device.

Example 58 may include an apparatus comprising means to perform one or more elements of a method described in or related to any of examples 1-29, or any other method or process described herein.

Example 59 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 60 may include an apparatus comprising control circuitry, transmit circuitry, and/or receive circuitry to perform one or more elements of a method described in or related to any of examples 1-29, or any other method or process described herein.

Example 61 may include a method of communicating in a wireless network as shown and described herein.

Example 62 may include a system for providing wireless communication as shown and described herein.

Example 63 may include a device for providing wireless communication as shown and described herein.

Other aspects and features of embodiments are as defined in the following numbered clauses:

1. Spectrum reservation circuitry for use in a source eNodeB or UE of a wireless communication system for establishing a downlink or uplink LTE-Licensed Assisted Access, LAA, connection for exchange of data with at least one destination UE or eNodeB respectively, the circuitry comprising:
   control circuitry for performing a carrier status check to determine whether spectrum of an unlicensed carrier is occupied or available for use;
   transmit circuitry configured to transmit, on the unlicensed carrier, an LAA Request to Send signal to the at least one destination eNodeB or UE dependent upon the carrier status check determining that the spectrum of the unlicensed carrier is available for use;
   receive circuitry configured to receive, on the unlicensed carrier, an LAA Clear to Send signal from at least a subset of the at least one destination eNodeB or UE in response to the Request to Send signal and depending upon availability of the spectrum of the unlicensed carrier as determined by a respective one of the at least one destination eNodeB or UE.
2. Spectrum reservation circuitry of clause 1, wherein at least one of: (i) the LAA Clear to Send signal is multiplexed on the UL in at least one of time and frequency resources of a frame to comprise a plurality of LAA Clear to Send signals from a respective plurality of the destination UEs; and (ii) the LAA Request to Send signal is multiplexed in the UL in at least one of time and frequency resources of a radio frame to comprise a plurality of LAA Request to Send signals on an uplink from a respective plurality of source UEs.
3. Spectrum reservation circuitry of clause 1 or clause 2, wherein the transmit circuitry is configured to transmit on the UL or DL, the LAA Request to Send Signal comprising identifiers for at least one destination electronic device, wherein only the identified destination electronic device(s) are permitted by the wireless communication system to send the LAA Clear to Send response signal.
4. Spectrum reservation circuitry of any one of clauses 1 to 3, wherein at least one of: the LAA Request to Send signal uses an IEEE 802.11 WiFi Request to Send frame structure; and the LAA Clear to Send signal uses a IEEE 802.11 WiFi Clear to Send frame structure.
5. Spectrum reservation circuitry of clause 4, wherein the LAA Request to Send signal uses the IEEE 802.11 WiFi Request to Send frame structure comprising a frame control field, a duration field, a transmitter address field, a receiver address field and a cyclic redundancy check field and wherein at least one of the transmitter address field configuration and the receiver address field configuration is modified relative to a WiFi configuration to accommodate LAA connection parameters.
6. Spectrum reservation circuitry of clause 4 or clause 5, wherein the LAA Clear to Send signal uses the IEEE 802.11 WiFi Clear to Send frame structure wherein the receiver address field is modified relative to a WiFi configuration to accommodate LAA connection parameters and wherein information in one or more remaining fields of the frame structure required to enable UEs to set a Network Allocation Vector is retained.
7. Spectrum reservation circuitry of any one of clauses 1 to 6, wherein the LAA Request to Send Signal comprises at least one of: a channel reservation duration; a time interval required either between the LAA Request to Send and the LAA Clear to Send signals or between the LAA Clear to Send signal and (E)PDCCH/Data or PUCCH/Data; power for the LAA Clear to Send signal; modulation information for the LAA Clear to Send signal; and one or more identifiers for the at least one destination UE.
8. Spectrum reservation circuitry of any one of clauses 2 to 7, wherein the LAA Clear to Send signal is multiplexed and comprises one bit for each of the plurality of multiplexed destination UEs and wherein the one bit is configurable to represent one of: an ACK, a channel reservation duration; and an LAA burst duration.
10. Spectrum reservation circuitry of any one of clauses 2 to 8, wherein the LAA Clear to Send signal is multiplexed and wherein the plurality of LAA Clear to Send signals from the respective plurality of destination UEs are multiplexed on one or more OFDMA symbols of the LTE radio frame using at least one of FDMA, IFDMA, TDMA and CDMA.
11. Spectrum reservation circuitry of any one of clauses 1 to 10, wherein a first time interval between transmission of the LAA Request to Send signal by the source eNodeB or UE and transmission of the LAA Clear to Send signal by the at least one destination UE or eNodeB is one of: a predetermined value, a value specified via dedicated RRC signalling and a value specified via an LAA control signal.
12. Spectrum reservation circuitry of any one of clauses 2 to 11, wherein the LAA Clear to Send signal is multiplexed and wherein the multiplexed LAA Clear to Send Signal comprises reference symbols corresponding to each of the plurality of destination UEs.
13. Spectrum reservation circuitry of clause 12, wherein the reference symbols and Clear to Send signals corresponding to the plurality of destination UEs are multiplexed on the same fractional or full OFDM symbol across at least a portion of a frequency band corresponding to the unlicensed carrier.

14. An eNodeB or a UE comprising the spectrum reservation circuitry of clause 1.

15. A UE comprising:
   a display;
   an antenna; and
   the spectrum reservation circuitry of clause 1.

16. Spectrum reservation circuitry for use in a destination UE or eNodeB of a wireless communication system for establishing a connection on an unlicensed component carrier of an aggregated carrier for exchange of data with a source eNodeB or UE, the circuitry comprising:
   receive circuitry configured to receive, on the unlicensed component carrier, an LAA Request to Send signal from the source eNodeB or UE, the LAA Request to Send Signal identifying at least the destination UE or eNodeB;
   a processor for performing a Clear Channel Assessment, CCA, or enhanced CCA to determine whether spectrum of the unlicensed component carrier corresponding to the LAA Request to Send signal is busy or idle;
   transmit circuitry configured to transmit, on the unlicensed component carrier, an LAA Clear to Send signal to the source eNodeB or UE, depending upon a result of the CCA/enhanced CCA.

17. Spectrum reservation circuitry of clause 16, wherein the spectrum reservation circuitry is implemented in the destination UE and wherein the LAA Request to Send signal identifies at least one further destination UE and wherein the transmit circuitry is configured to transmit the LAA Clear to Send signal on radio frame resource elements according to received LAA scheduling and control information such that a plurality of other LAA Clear to Send signals from the at least one further destination UE are multiplexed, upon receipt at the source eNodeB, with the LAA Clear to Send Signal of the destination UE using at least one of: IFDMA, FDMA, TDMA and CDMA.

18. Spectrum reservation circuitry of clause 16 or clause 17, wherein the transmit circuitry is configured to transmit the LAA Clear to Send Signal conditional upon an identifier of the destination UE or eNodeB being included in the received LAA Request to Send Signal and only if the CCA/enhanced CCA indicates that the unlicensed carrier is idle.

19. Spectrum reservation circuitry of any one of clauses 16 to 18, wherein a second time interval between transmission of the LAA Clear to Send signal by at least one of the destination UEs or eNodeB and transmission of data on an EPDCCH/PDCCH or PUCCH by the source eNodeB or UE respectively is one of: a predetermined value; a value specified via dedicated RRC signalling; and a value specified via an LAA control signal.

20. An eNodeB or a UE comprising the spectrum reservation circuitry of clause 16.

21. A non-transitory or transitory computer readable medium comprising program instructions, which upon execution by one or more processors of a source eNB or UE for establishing a Licensed Assisted Access wireless connection with a destination UE or eNB respectively, the method comprising:
   performing a Clear Channel Assessment, CCA, or enhanced CCA to determine whether an unlicensed spectrum bandwidth is busy or clear;
   transmitting, on the unlicensed spectrum bandwidth, an LAA Request to Send signal to the at least one destination eNodeB or UE dependent upon the CCA or enhanced CCA determining that the unlicensed spectrum bandwidth is clear;
   receiving, on the unlicensed spectrum bandwidth, an LAA Clear to Send signal from at least one of the at least one destination eNodeB or UE in response to the Request to Send signal and depending upon availability of the unlicensed spectrum bandwidth as determined by a respective one of the at least one destination eNodeB or UE.

22. The non-transitory or transitory computer readable medium of clause 21, wherein the received LAA Clear to Send Signal comprises a plurality of individual Clear to Send signals from a respective plurality of destination UEs, the plurality of individual Clear to Send signals being multiplexed onto a fraction of an OFDM symbol or a single OFDM symbol across at least a portion of the unlicensed spectrum bandwidth using at least one of: IFDMA, FDMA, TDMA and CDMA.

23. A non-transitory or transitory computer readable medium comprising program instructions, which upon execution by one or more processors of a destination UE or of an eNB for establishing a wireless connection with a source eNB or UE, the method comprising:
   receiving on a contentiously-accessed secondary carrier of an LTE Licence Assisted Access, LAA, connection, an LAA Request to Send signal from the source eNodeB or UE;
   performing a Clear Channel Assessment, CCA, or enhanced CCA at the destination UE or eNodeB of radio spectrum of the contentiously-accessed secondary carrier corresponding to the LAA Request to Send signal to determine if the contentiously-accessed secondary carrier is available or occupied;
   transmitting, on the contentiously-accessed secondary carrier, an LAA Clear to Send signal to the source eNodeB or UE, depending upon a result of the CCA or enhanced CCA.

24. The non-transitory or transitory computer readable medium of clause 23, wherein the LAA Request to Send signal is received as one of: a part of an LAA burst frame; as a standalone LAA Request to Send signal; and a part of an LAA control signal.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. Spectrum reservation circuitry for use in a source eNodeB or UE of a wireless communication system for establishing a downlink or uplink LTE-Licensed Assisted Access, LAA, connection for exchange of data with at least one destination UE or eNodeB respectively, the circuitry comprising:
   control circuitry for performing a carrier status check to determine whether spectrum of an unlicensed carrier is occupied or available for use;
   transmit circuitry configured to transmit, on the unlicensed carrier, an LAA Request to Send signal to the at least one destination eNodeB or UE dependent upon the carrier status check determining that the spectrum of the unlicensed carrier is available for use; and receive circuitry configured to receive, on the unlicensed carrier, an LAA Clear to Send signal from at least a subset of the at least one destination eNodeB or UE in response to the Request to Send signal and depending upon availability of the spectrum of the unlicensed carrier as determined by a respective one of the at least one destination eNodeB or UE, wherein the LAA Clear to Send signal is multiplexed and wherein the multiplexed LAA Clear to Send Signal comprises reference symbols corresponding to a respective one of a plurality of destination UEs.

2. Spectrum reservation circuitry of claim 1, wherein at least one of:
(i) the LAA Clear to Send signal is multiplexed on the UL in at least one of time and frequency resources of a frame to comprise a plurality of LAA Clear to Send signals from a respective plurality of the destination UEs; and
(ii) the LAA Request to Send signal is multiplexed in the UL in at least one of time and frequency resources of a radio frame to comprise a plurality of LAA Request to Send signals on an uplink from a respective plurality of source UEs.

3. Spectrum reservation circuitry of claim 1, wherein the transmit circuitry is configured to transmit on the UL or DL, the LAA Request to Send Signal comprising identifiers for at least one destination electronic device, wherein only the identified destination electronic device(s) are permitted by the wireless communication system to send the LAA Clear to Send response signal.

4. Spectrum reservation circuitry of claim 1, wherein at least one of:
the LAA Request to Send signal uses an IEEE 802.11 WiFi Request to Send frame structure; and
the LAA Clear to Send signal uses a IEEE 802.11 WiFi Clear to Send frame structure.

5. Spectrum reservation circuitry of claim 4, wherein the LAA Request to Send signal uses the IEEE 802.11 WiFi Request to Send frame structure comprising a frame control field, a duration field, a transmitter address field, a receiver address field and a cyclic redundancy check field and wherein at least one of the transmitter address field configuration and the receiver address field configuration is modified relative to a WiFi configuration to accommodate LAA connection parameters.

6. Spectrum reservation circuitry of claim 4, wherein the LAA Clear to Send signal uses the IEEE 802.11 WiFi Clear to Send frame structure wherein the receiver address field is modified relative to a WiFi configuration to accommodate LAA connection parameters and wherein information in one or more remaining fields of the frame structure required to enable UEs to set a Network Allocation Vector is retained.

7. Spectrum reservation circuitry of claim 1, wherein the LAA Request to Send Signal comprises at least one of:
a channel reservation duration;
a time interval required either between the LAA Request to Send and the LAA Clear to Send signals or between the LAA Clear to Send signal and (E)PDCCH/Data or PUCCH/Data;
power for the LAA Clear to Send signal;
modulation information for the LAA Clear to Send signal; and
one or more identifiers for the at least one destination UE.

8. Spectrum reservation circuitry of claim 2, wherein the LAA Clear to Send signal is multiplexed and comprises one bit for each of the plurality of multiplexed destination UEs and wherein the one bit is configurable to represent one of: an ACK, a channel reservation duration; and an LAA burst duration.

9. Spectrum reservation circuitry of claim 2, wherein the LAA Clear to Send signal is multiplexed and wherein the plurality of LAA Clear to Send signals from the respective plurality of destination UEs are multiplexed on one or more OFDMA symbols of the LTE radio frame using at least one of FDMA, IFDMA, TDMA and CDMA.

10. Spectrum reservation circuitry of claim 1, wherein a first time interval between transmission of the LAA Request to Send signal by the source eNodeB or UE and transmission of the LAA Clear to Send signal by the at least one destination UE or eNodeB is one of: a predetermined value, a value specified via dedicated RRC signaling and a value specified via an LAA control signal.

11. Spectrum reservation circuitry of claim 2, the reference symbols and Clear to Send signals corresponding to the plurality of destination UEs are multiplexed on the same fractional or full OFDM symbol across at least a portion of a frequency band corresponding to the unlicensed carrier.

12. An eNodeB or a UE comprising the spectrum reservation circuitry of claim 1.

13. A UE comprising:
a display;
an antenna; and
the spectrum reservation circuitry of claim 1.

14. Spectrum reservation circuitry for use in a destination UE or eNodeB of a wireless communication system for establishing a connection on an unlicensed component carrier of an aggregated carrier for exchange of data with a source eNodeB or UE, the circuitry comprising:
receive circuitry configured to receive, on the unlicensed component carrier, an LAA Request to Send signal from the source eNodeB or UE, the LAA Request to Send Signal identifying at least the destination UE or eNodeB;
a processor for performing a Clear Channel Assessment, CCA, or enhanced CCA to determine whether spectrum of the unlicensed component carrier corresponding to the LAA Request to Send signal is busy or idle;
transmit circuitry configured to transmit, on the unlicensed component carrier, an LAA Clear to Send signal to the source eNodeB or UE, depending upon a result of the CCA/enhanced CCA,
wherein the spectrum reservation circuitry is implemented in the destination UE and wherein the LAA Request to Send signal identifies at least one further destination UE and wherein the transmit circuitry is configured to transmit the LAA Clear to Send signal on radio frame resource elements according to received LAA scheduling and control information such that a plurality of other LAA Clear to Send signals from the at least one further destination UE are multiplexed, upon receipt at the source eNodeB, with the LAA Clear to Send Signal of the destination UE using at least one of: IFDMA, FDMA, TDMA and CDMA.

15. Spectrum reservation circuitry of claim 14, wherein the transmit circuitry is configured to transmit the LAA Clear to Send Signal conditional upon an identifier of the destination UE or eNodeB being included in the received LAA Request to Send Signal and only if the CCA/enhanced CCA indicates that the unlicensed carrier is idle.

16. Spectrum reservation circuitry of claim 14, wherein a second time interval between transmission of the LAA Clear to Send signal by at least one of the destination UEs or eNodeB and transmission of data on an EPDCCH/PDCCH or PUCCH by the source eNodeB or UE respectively is one of: a predetermined value; a value specified via dedicated RRC signalling; and a value specified via an LAA control signal.

17. An eNodeB or a UE comprising the spectrum reservation circuitry of claim 14.

18. A non-transitory computer readable medium comprising program instructions, which upon execution by one or more processors of a source eNB or UE for establishing a Licensed Assisted Access wireless connection with a destination UE or eNB respectively, the method comprising:
- performing a Clear Channel Assessment, CCA, or enhanced CCA to determine whether an unlicensed spectrum bandwidth is busy or clear;
- transmitting, on the unlicensed spectrum bandwidth, an LAA Request to Send signal to the at least one destination eNodeB or UE dependent upon the CCA or enhanced CCA determining that the unlicensed spectrum bandwidth is clear;
- receiving, on the unlicensed spectrum bandwidth, an LAA Clear to Send signal from at least one of the at least one destination eNodeB or UE in response to the Request to Send signal and depending upon availability of the unlicensed spectrum bandwidth as determined by a respective one of the at least one destination eNodeB or UE,
- wherein the LAA Clear to Send signal is multiplexed and wherein the multiplexed LAA Clear to Send Signal comprises reference symbols corresponding to a respective one of a plurality of destination UEs.

19. The non-transitory computer readable medium of claim 18, wherein the received LAA Clear to Send Signal comprises a plurality of individual Clear to Send signals from a respective plurality of destination UEs, the plurality of individual Clear to Send signals being multiplexed onto a fraction of an OFDM symbol or a single OFDM symbol across at least a portion of the unlicensed spectrum bandwidth using at least one of: IFDMA, FDMA, TDMA and CDMA.

20. A non-transitory computer readable medium comprising program instructions, which upon execution by one or more processors of a destination UE or of an eNB for establishing a wireless connection with a source eNB or UE, the method comprising:
- receiving on a contentiously-accessed secondary carrier of an LTE Licence Assisted Access, LAA, connection, an LAA Request to Send signal from the source eNodeB or UE;
- performing a Clear Channel Assessment, CCA, or enhanced CCA at the destination UE or eNodeB of radio spectrum of the contentiously-accessed secondary carrier corresponding to the LAA Request to Send signal to determine if the contentiously-accessed secondary carrier is available or occupied;
- transmitting, on the contentiously-accessed secondary carrier, an LAA Clear to Send signal to the source eNodeB or UE, depending upon a result of the CCA or enhanced CCA;
- wherein spectrum reservation circuitry is implemented in the destination UE and wherein the LAA Request to Send signal identifies at least one further destination UE and wherein the transmit circuitry is configured to transmit the LAA Clear to Send signal on radio frame resource elements according to received LAA scheduling and control information such that a plurality of other LAA Clear to Send signals from the at least one further destination UE are multiplexed, upon receipt at the source eNodeB, with the LAA Clear to Send Signal of the destination UE using at least one of: IFDMA, FDMA, TDMA and CDMA.

21. The non-transitory computer readable medium of claim 20, wherein the LAA Request to Send signal is received as one of: a part of an LAA burst frame; as a standalone LAA Request to Send signal; and a part of an LAA control signal.

* * * * *